United States Patent
Chen et al.

(10) Patent No.: US 9,668,167 B2
(45) Date of Patent: May 30, 2017

(54) TRANSPORT BLOCK SIZE LIMITATION FOR ENHANCED CONTROL CHANNEL OPERATION IN LTE

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 468 days.

(21) Appl. No.: 13/765,315

(22) Filed: Feb. 12, 2013

(65) Prior Publication Data

US 2013/0242729 A1  Sep. 19, 2013

Related U.S. Application Data

(60) Provisional application No. 61/612,088, filed on Mar. 16, 2012, provisional application No. 61/703,655, filed on Sep. 20, 2012.

(51) Int. Cl.
*H04L 5/14* (2006.01)
*H04B 7/00* (2006.01)
(Continued)

(52) U.S. Cl.
CPC ......... *H04W 28/0289* (2013.01); *H04L 1/005* (2013.01); *H04L 1/0007* (2013.01);
(Continued)

(58) Field of Classification Search
CPC ........... H04H 20/71; H04J 3/00; H04B 15/00; H04W 84/00; H04W 72/04; H04W 88/08
See application file for complete search history.

(56) References Cited

U.S. PATENT DOCUMENTS 8,332,708 B2   12/2012  Nagaraja
2009/0077456 A1  3/2009  Pi et al.
(Continued)

FOREIGN PATENT DOCUMENTS

EP   2273710 A1   1/2011
EP   2495886 A1   9/2012
(Continued)

OTHER PUBLICATIONS

International Search Report and Written Opinion—PCT/ US2013/025941—ISA/EPO—Aug. 2, 2013.
(Continued)

*Primary Examiner* — Brian Roberts
*Assistant Examiner* — Abu-Sayeed Haque
(74) *Attorney, Agent, or Firm* — Norton Rose Fulbright LLP

(57) ABSTRACT

In wireless communication carried out by a user equipment (UE), the UE receives one or more transport blocks and makes a determination on the transport blocks, such as determining whether block size and timing advance exceed thresholds, or determining a control channel type associated with the received transport blocks. The UE makes a determination whether to perform skip-decoding of the received transport blocks based, at least in part, on the determination made.

66 Claims, 20 Drawing Sheets

(51) Int. Cl.
*H04L 12/28* (2006.01)
*H04J 3/16* (2006.01)
*H04W 28/02* (2009.01)
*H04L 1/00* (2006.01)
*H04L 1/18* (2006.01)
*H04W 56/00* (2009.01)
*H04L 5/00* (2006.01)

(52) U.S. Cl.
CPC .......... H04L 1/0051 (2013.01); H04L 1/1829 (2013.01); H04L 1/1835 (2013.01); H04L 1/1854 (2013.01); H04L 5/001 (2013.01); H04L 5/008 (2013.01); H04L 5/0053 (2013.01); H04L 5/1438 (2013.01); H04W 56/0045 (2013.01)

(56) References Cited

U.S. PATENT DOCUMENTS

| | | | | |
|---|---|---|---|---|
| 2009/0252075 | A1* | 10/2009 | Ji | H04W 56/00 370/312 |
| 2010/0113058 | A1 | 5/2010 | Wu | |
| 2010/0184489 | A1* | 7/2010 | Penther | H04W 52/029 455/574 |
| 2010/0303016 | A1 | 12/2010 | Jin et al. | |
| 2011/0223924 | A1* | 9/2011 | Lohr | H04W 72/042 455/450 |
| 2011/0274066 | A1* | 11/2011 | Tee | H04L 5/001 370/329 |
| 2012/0057480 | A1* | 3/2012 | Yoo | H04L 5/0023 370/252 |
| 2012/0176884 | A1* | 7/2012 | Zhang | H04B 7/024 370/203 |
| 2012/0213137 | A1 | 8/2012 | Jeong et al. | |
| 2013/0039284 | A1* | 2/2013 | Marinier | H04L 5/001 370/329 |
| 2013/0044692 | A1* | 2/2013 | Nory | H04L 25/0228 370/329 |
| 2013/0044693 | A1* | 2/2013 | Lindh | H04L 5/0026 370/329 |
| 2013/0051272 | A1* | 2/2013 | Wiberg | H04L 1/1829 370/252 |
| 2013/0114766 | A1* | 5/2013 | Mueller-Weinfurtner | H03M 13/3994 375/341 |
| 2013/0195067 | A1* | 8/2013 | Khoshnevis | H04L 5/0094 370/330 |
| 2014/0053049 | A1* | 2/2014 | Chen | H04L 1/0051 714/807 |

FOREIGN PATENT DOCUMENTS

| | | |
|---|---|---|
| WO | 2011050743 A1 | 5/2011 |
| WO | WO-2012149908 A1 | 11/2012 |

OTHER PUBLICATIONS

Nokia et al: "On the Number of HARQ-processes", 3GPP Draft; R1-073673, 3rd Generation Partnership Project (3GPP), Mobile Competence Centre ; 650, Route Des Lucioles; F-06921 Sophia-Antipolis Cedex; France, vol. RAN WG1, No. Athens, Greece; 20070815, Aug. 15, 2007 (Aug. 15, 2007), XP050107269, [retrieved on Aug. 15, 2007], p. 5, paragraph 1, section 6: Support for large cell sizes.
Renesas Mobile Europe LTD: "Multiplexing between POSCH and E-PDCCH", 3GPP Draft; R1-113900, 3rd Generation Partnership Project(3GPP), Mobile Competence Centre; 650, Route Des Lucioles; F-06921 Sophia-Antipolis Cedex; France, vol. RAN WG1, No. San Francisco, USA;20111114-20111118, Nov. 8, 2011 (Nov. 8, 2011), XP050561979, [retrieved on Nov. 8, 2011] figures 2-4, p. 4, line 24-line 26, p. 3, line 9-line 10, p. 4, line 1-line 6; table 1, p. 4, line 25-line 26.
Partial International Search Report—PCT/US2013/025941—ISA/EPO—Jun. 6, 2013.
Qualcomm Incorporated: "E-PDCCH Requirements", 3GPP Draft; R1-113396; EPDCCH, 3rd Generation Partnership Project (3GPP), Mobile Competence Centre; 650, Route Des Lucioles; F-06921 Sophia-Antipolis Cedex; France. vol. RAN WG1, No. Zhuhai; 20111010; Oct. 4, 2011 (Oct. 4, 2011), XP050538452.
Taiwan Search Report—TW102107884—TIPO—Oct. 22, 2014.
European Search Report—EP15167056—Search Authority—The Hague—Jul. 3, 2015.
European Search Report—EP15167057—Search Authority—The Hague—Jul. 3, 2015.
Motorola: "Details of Transport Block Sizes Mapped to Three and Four Layers[online]," 3GPP TSG-RAN WG1#63 R1-106293, , Nov. 9, 2010, 6 pages.
QUALCOMM Incorporated: "Multiplexing e-PDDCH with PDSCH [online]," 3GPP Tsg-Ran WG1#68 R1-120560, < URL:http://www.3gpp.org/ftp/tsg_ran/WG1_RL1/TSGR1_68/Docs/R1-120560.zip>, Jan. 31, 2012, 3 pages.

* cited by examiner

TRANSPORT BLOCK SIZE LIMITATION FOR ENHANCED CONTROL CHANNEL OPERATION IN LTE

CROSS-REFERENCE TO RELATED APPLICATIONS

This application claims the benefit of U.S. Provisional Patent Application No. 61/612,088, entitled, "TRANSPORT BLOCK SIZE LIMITATION FOR ENHANCED CONTROL CHANNEL OPERATION IN LTE", filed on Mar. 16, 2012, and U.S. Provisional Patent Application No. 61/703,655, entitled, "TRANSPORT BLOCK SIZE LIMITATION FOR ENHANCED CONTROL CHANNEL OPERATION IN LTE", filed on Sep. 20, 2012, which is expressly incorporated by reference herein in its entirety.

BACKGROUND

Field

Aspects of the present disclosure relate generally to wireless communication systems, and more particularly, to transport block size limitation for enhanced control channel operation in long term evolution (LTE).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In some aspects, wireless communication is carried out by a UE. The UE receives one or more transport blocks, determines a control channel type associated with the one or more transport blocks, and selects to perform a skip-decoding of the transport blocks based, at least in part, on the control channel type.

Additional aspects of the present disclosure are directed to a method of wireless communication that includes determining, at a base station, a control channel type associated with one or more transport blocks for communication to a UE, determining whether to restrict a size of at least one transport block of the one or more transport blocks, wherein the determination is based, at least in part, on the control channel type, and transmitting the one or more transport blocks to the UE based on the determination.

Additional aspects of the present disclosure are directed to an apparatus configured for wireless communication that includes means for receiving, by a UE, one or more transport blocks, means for determining a control channel type associated with the one or more transport blocks, and means for selecting, by the UE, to perform a skip-decoding of the one or more transport blocks based, at least in part, on the control channel type.

Additional aspects of the present disclosure are directed to an apparatus configured for wireless communication that includes means for determining, at a base station, a control channel type associated with one or more transport blocks for communication to a UE, means for determining whether to restrict a size of at least one transport block of the one or more transport blocks, wherein the determination is based, at least in part, on the control channel type, and means for transmitting the one or more transport blocks to the UE based on the determination.

In other aspects, a computer program product for wireless communications in a wireless network includes a non-transitory computer-readable medium having program code recorded thereon. The program code includes code to receive, by a UE, one or more transport blocks, code to determine a control channel type associated with the one or more transport blocks, and code to select, by the UE, to perform a skip-decoding of the one or more transport blocks based, at least in part, on the control channel type.

In other aspects, a computer program product for wireless communications in a wireless network includes a non-transitory computer-readable medium having program code recorded thereon. The program code includes code to determine, at a base station, a control channel type associated with one or more transport blocks for communication to a UE, code to determine whether to restrict a size of at least one transport block of the one or more transport blocks, wherein the determination is based, at least in part, on the control channel type, and code to transmit the one or more transport blocks to the UE based on the determination.

In still other aspects, an apparatus configured for wireless communication has at least one processor and a memory coupled to the at least one processor. The at least one processor is configured to receive, by a UE, one or more transport blocks. The at least one processor is also configured to receive, by a UE, one or more transport blocks, to determine a control channel type associated with the one or more transport blocks, and to select, by the UE, to perform a skip-decoding of the one or more transport blocks based, at least in part, on the control channel type.

In some aspects, wireless communication is carried out by a UE. The UE receives one or more transport blocks. The UE performs a size determination whether a block size of at least one transport block of the one or more transport blocks exceeds a block size threshold. The UE performs a timing determination whether a timing advance of the at least one transport block exceeds a timing advance threshold. The UE makes a skip-decoding decision whether to perform skip-decoding of the at least one transport block at least partly in response to results of the size determination and the timing determination.

In additional aspects, an apparatus configured for wireless communication includes means for receiving, by a UE, one or more transport blocks. The apparatus also includes means for performing, by the UE, a size determination whether a block size of at least one transport block of the one or more transport blocks exceeds a block size threshold. The apparatus additionally includes means for performing, by the UE, a timing determination whether a timing advance of the at least one transport block exceeds a timing advance threshold. The apparatus further includes means for making a skip-decoding decision, by the UE, whether to perform skip-decoding of the at least one transport block at least partly in response to results of the size determination and the timing determination.

In other aspects, a computer program product for wireless communications in a wireless network includes a non-transitory computer-readable medium having program code recorded thereon. The program code includes code to receive, by a UE, one or more transport blocks. The program code also includes code to perform, by the UE, a size determination whether a block size of at least one transport block of the one or more transport blocks exceeds a block size threshold. The program code additionally includes code to perform, by the UE, a timing determination whether a timing advance of the at least one transport block exceeds a timing advance threshold. The program code further includes code to make a skip-decoding decision, by the UE, whether to perform skip decoding of the at least one transport block at least partly in response to results of the size determination and the timing determination.

In still other aspects, an apparatus configured for wireless communication has at least one processor and a memory coupled to the at least one processor. The at least one processor is configured to receive, by a UE, one or more transport blocks. The at least one processor is also configured to perform, by the UE, a size determination whether a block size of at least one transport block of the one or more transport blocks exceeds a block size threshold. The at least one processor is additionally configured to perform, by the UE, a timing determination whether a timing advance of the at least one transport block exceeds a timing advance threshold. The at least one processor is further configured to make a skip-decoding decision, by the UE, whether to perform skip decoding of the at least one transport block at least partly in response to results of the size determination and the timing determination.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
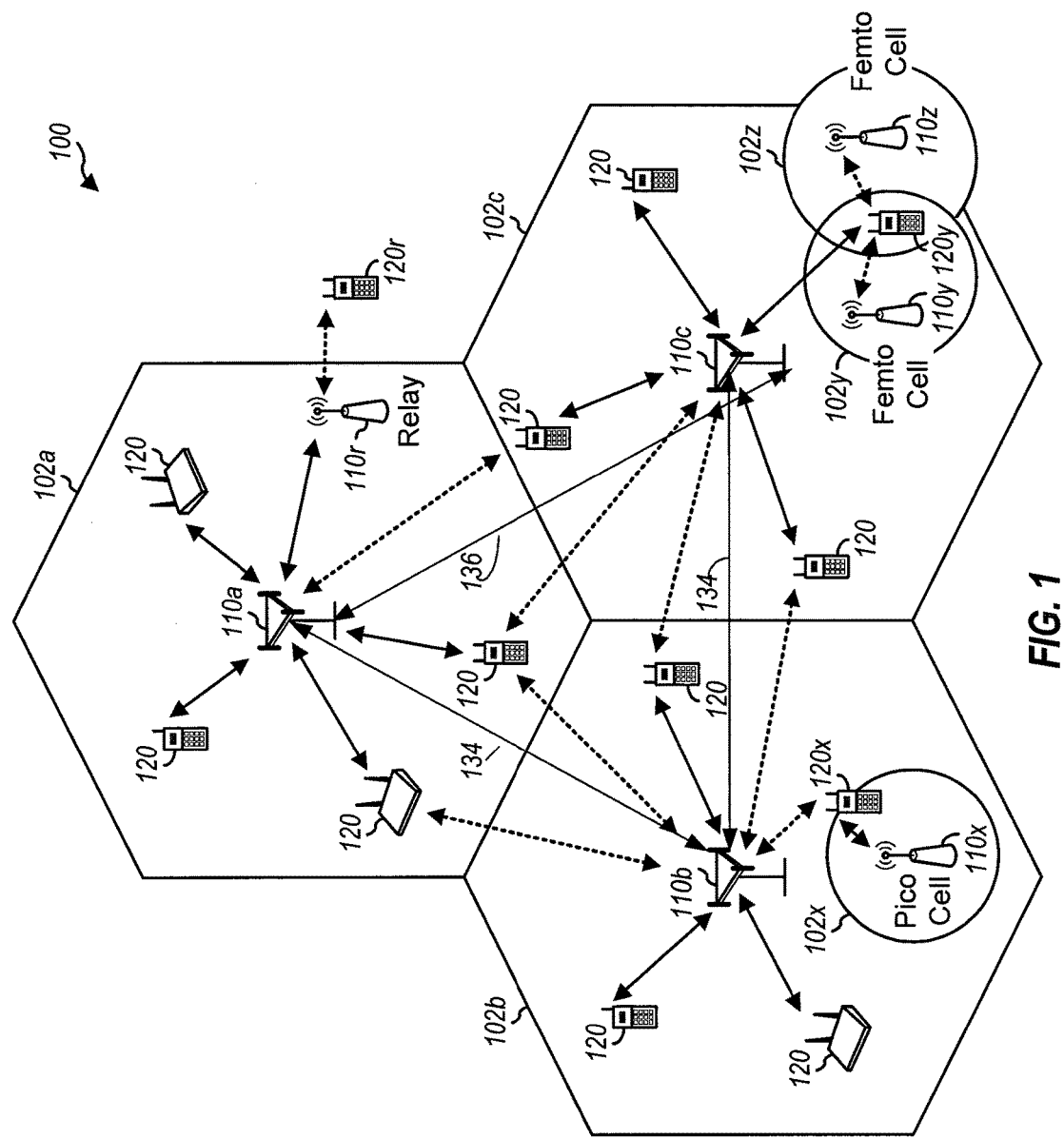
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
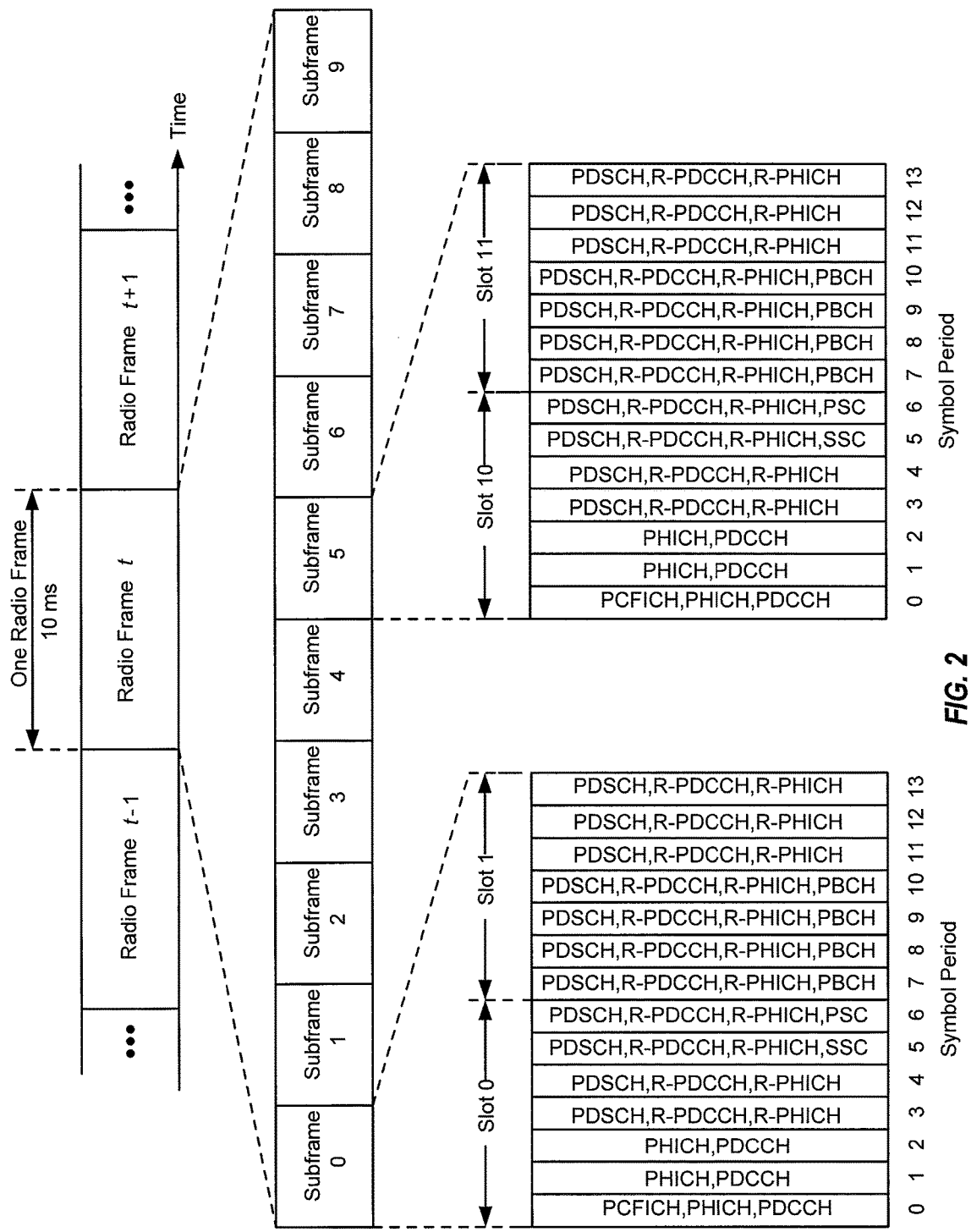
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to, resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
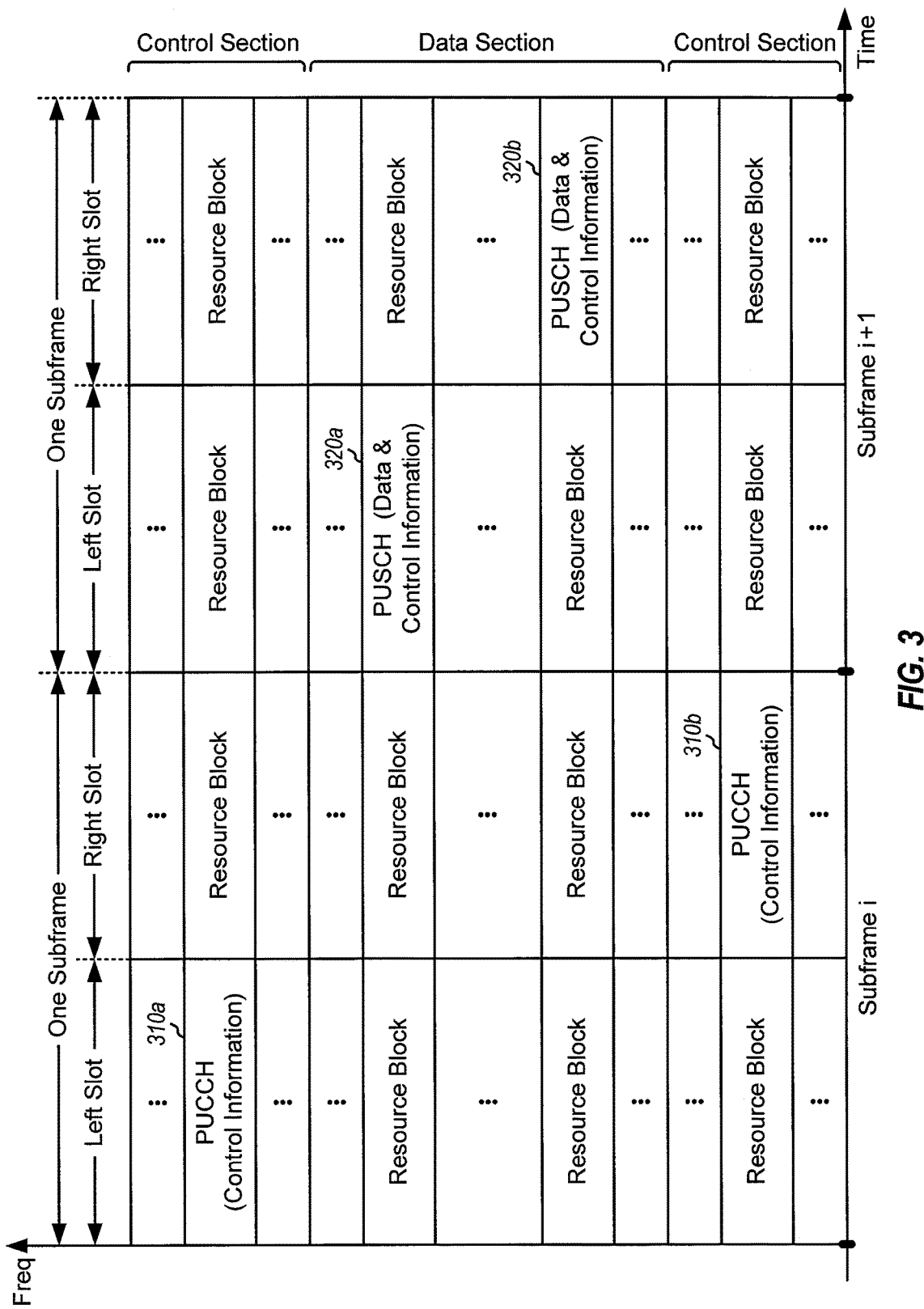
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
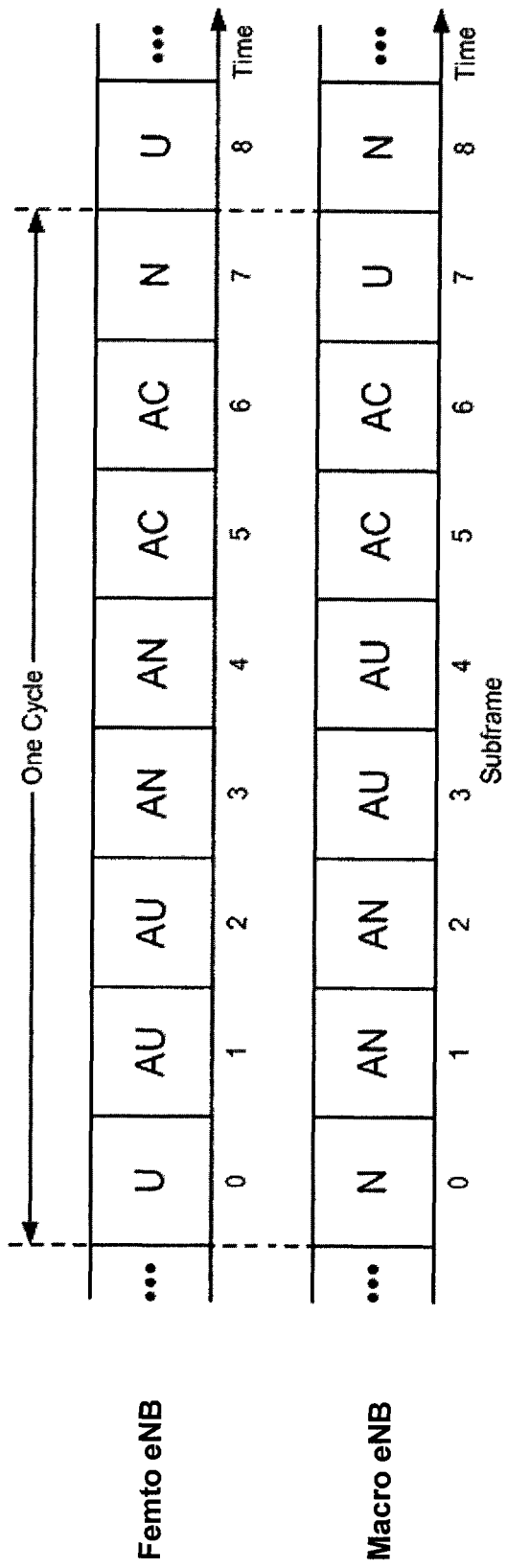
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for cell range extension (CRE) UEs strongly affected by aggressor eNBs. A CRE UE may belong to a first eNB but also be located in the coverage area of a second eNB. For example, a UE communicating with a macro eNB that is near the range limit of a femto eNB coverage is a CRE UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120$y$ may be close to the femto eNB 110$y$ and may have high received power for the eNB 110$y$. However, the UE 120$y$ may not be able to access the femto eNB 110$y$ due to restricted association and may then connect to the macro eNB 110$c$ (as shown in FIG. 1) or to the femto eNB 110$z$ also with lower received power (not shown in FIG. 1). The UE 120$y$ may then observe high interference from the femto eNB 110$y$ on the downlink and may also cause high interference to the eNB 110$y$ on the uplink. Using coordinated interference management, the eNB 110$c$ and the femto eNB 110$y$ may communicate over the backhaul 134 to negotiate resources. In the negotiation, the femto eNB 110$y$ agrees to cease transmission on one of its channel resources, such that the UE 120$y$ will not experience as much interference from the femto eNB 110$y$ as it communicates with the eNB 110$c$ over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
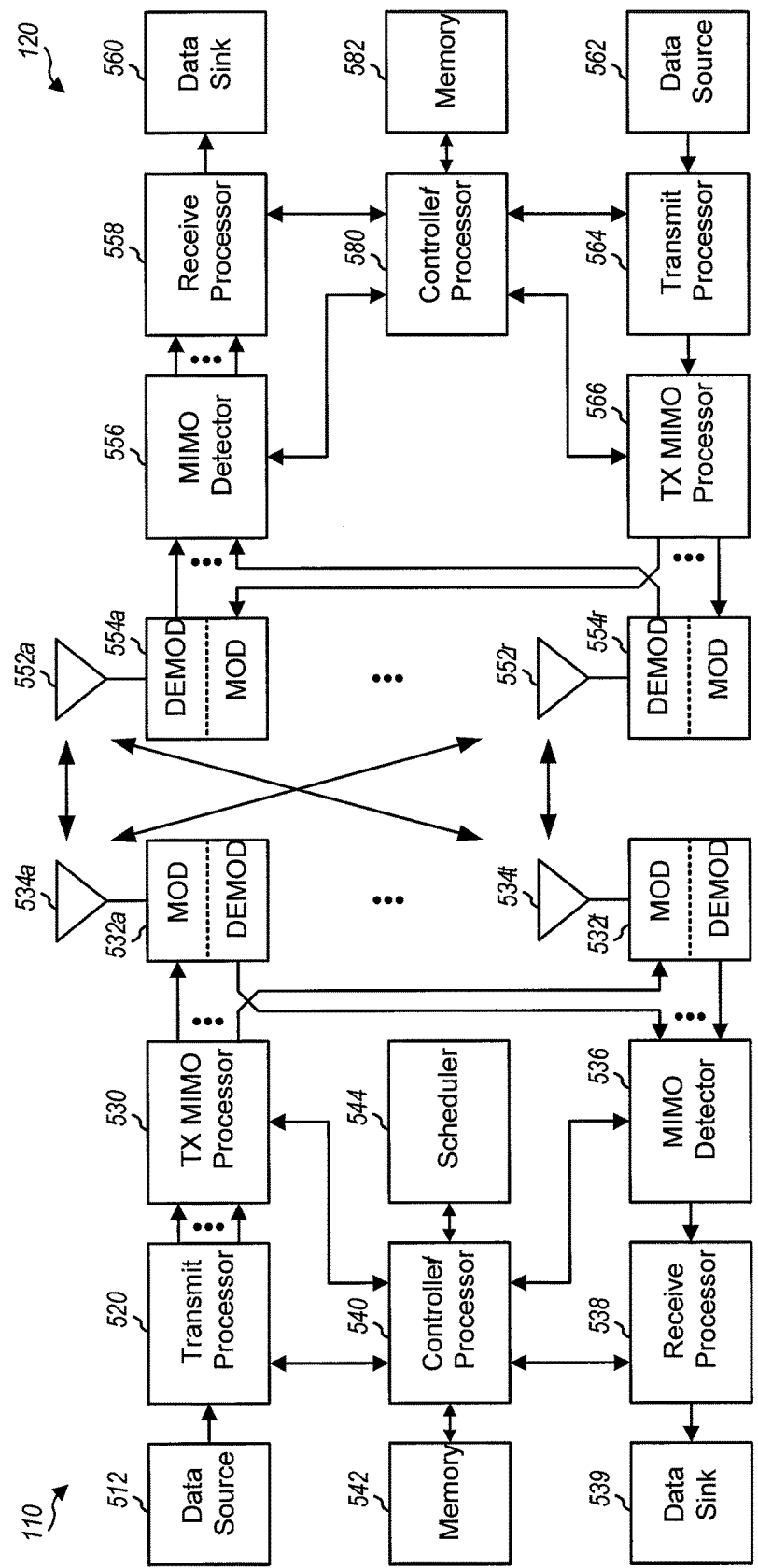
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110$c$ in FIG. 1, and the UE 120 may be the UE 120$y$. The eNB 110 may also be a base station of some other type. The eNB 110 may be equipped with antennas 534$a$ through 534$t$, and the UE 120 may be equipped with antennas 552$a$ through 552$r$.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 8-11, 13-15, 17-21, 23, and 24, and/or other processes for the techniques described herein. The memories 542 and 582 may store data and program codes for the eNB 110 and the UE 120, respectively. A scheduler 544 may schedule UEs for data transmission on the downlink and/or uplink.

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Figure 6A:
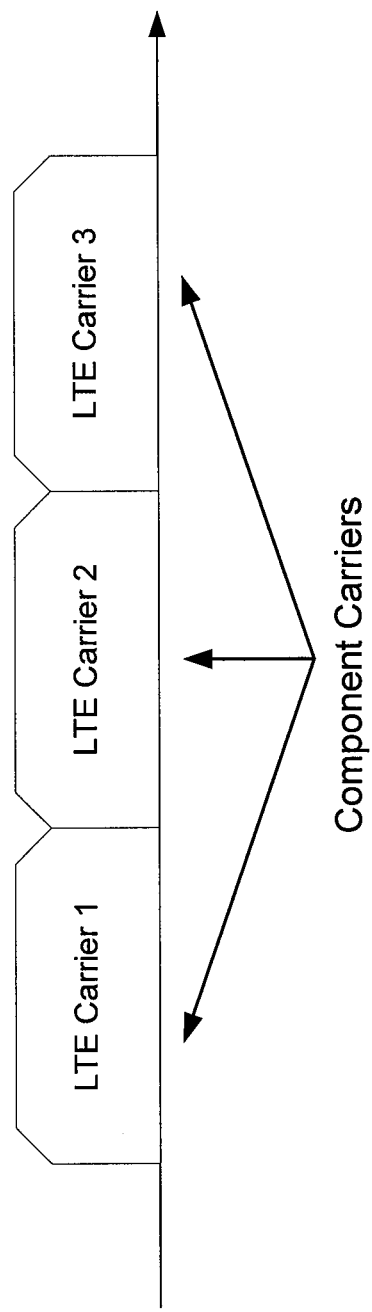
FIG. 6A discloses a continuous carrier aggregation type.
Figure 6B:
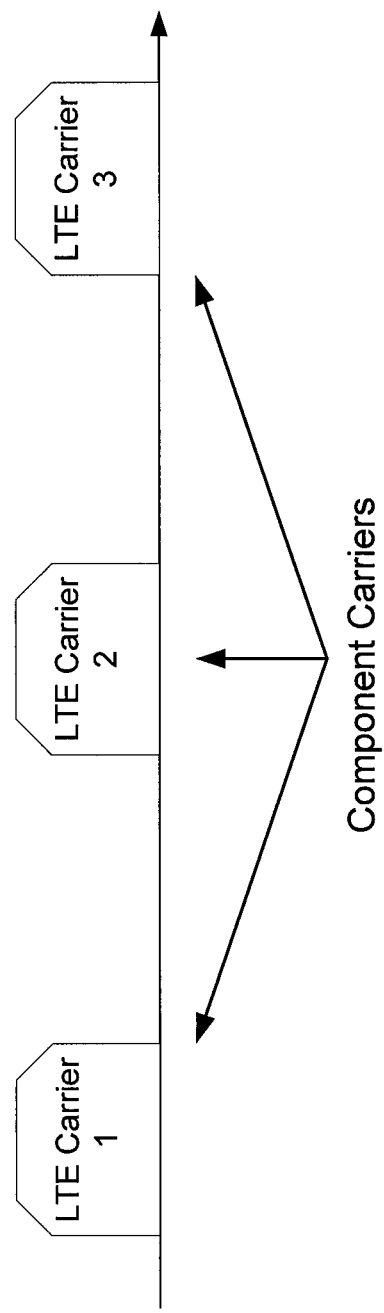
FIG. 6B discloses a non-continuous carrier aggregation type.

For the LTE-Advanced mobile systems, two types of carrier aggregation (CA) methods have been proposed, continuous CA and non-continuous CA. They are illustrated in FIGS. 6A and 6B. Non-continuous CA occurs when multiple available component carriers are separated along the frequency band (FIG. 6B). On the other hand, continuous CA occurs when multiple available component carriers are adjacent to each other (FIG. 6A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 7:
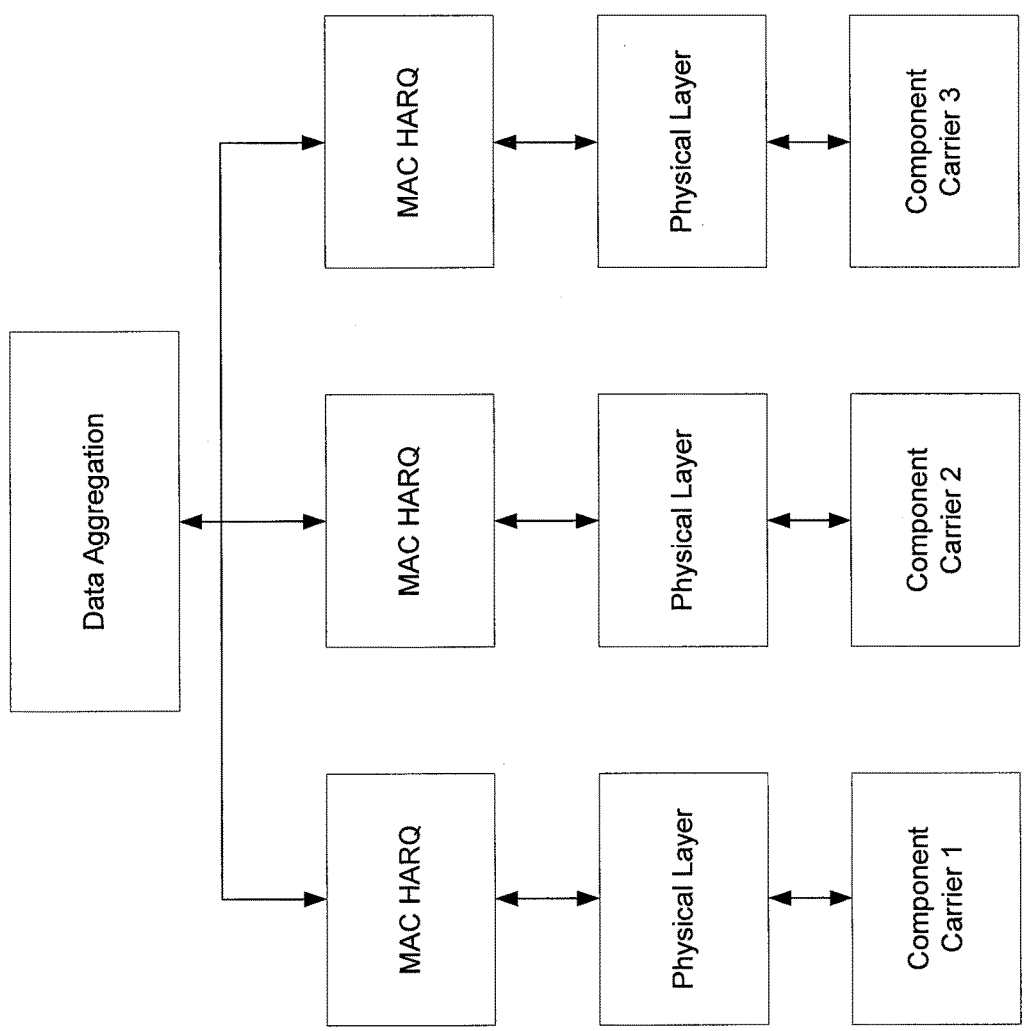
FIG. 7 discloses MAC layer data aggregation.

FIG. 7 illustrates aggregating transport blocks from different component carriers at the medium access control (MAC) layer (FIG. 7) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 8:
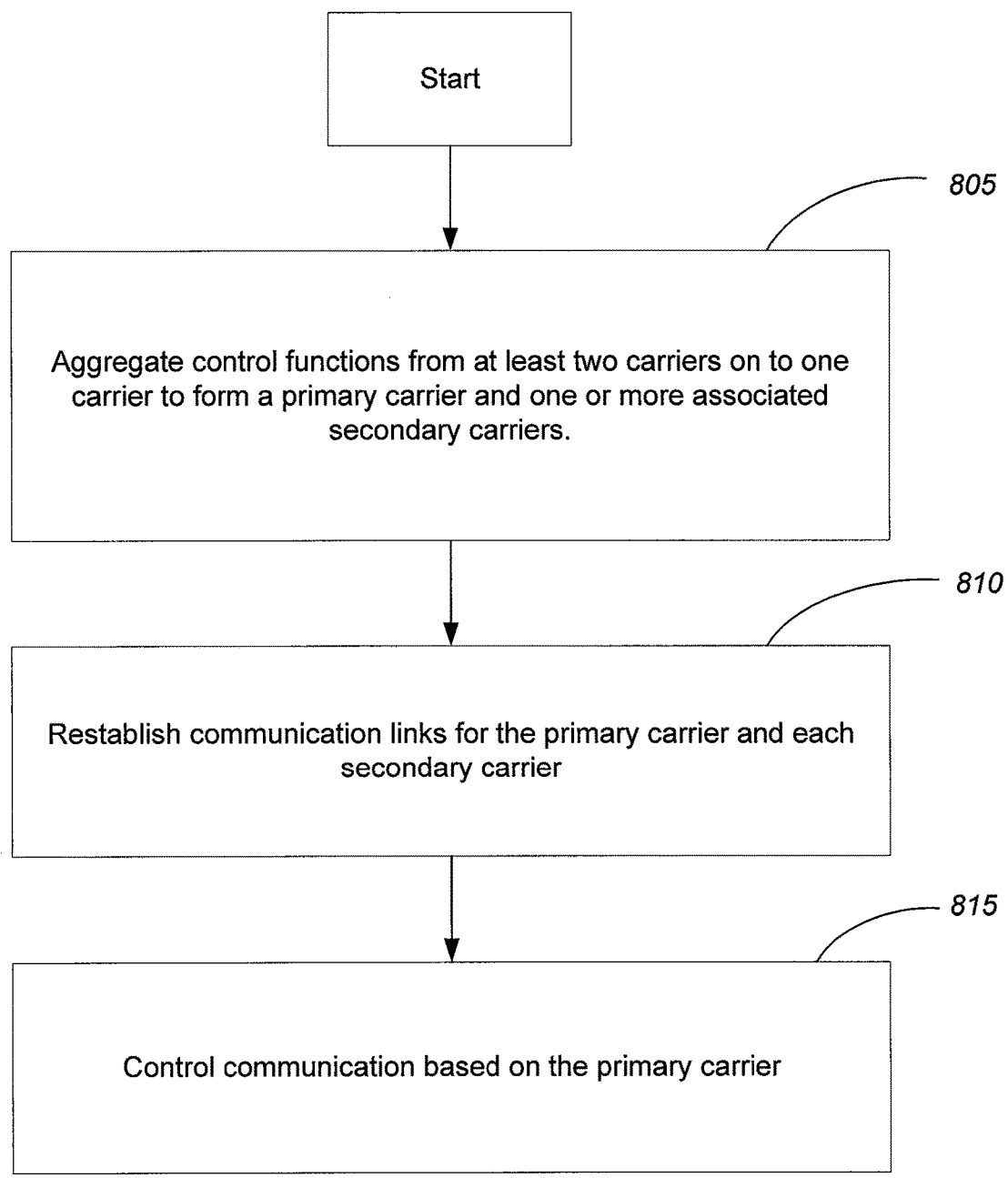
FIG. 8 is a functional block diagram illustrating example blocks executed to implement one aspect of the present disclosure.

FIG. 8 illustrates a method 800 for controlling radio links in a multiple carrier wireless communication system by grouping physical channels according to one example. As shown, the method includes, at block 805, aggregating control functions from at least two carriers onto one carrier to form a primary carrier and one or more associated secondary carriers. Next at block, 810, communication links are established for the primary carrier and each secondary carrier. Then, communication is controlled based on the primary carrier in block 815.

In existing LTE implementations, PDCCH has occupied the first several control symbols in a subframe. It is envisioned that future implementations of LTE will allow the PDCCH to occupy the data region, similar to PDSCH. Termed enhanced PDCCH (EPDCCH), this modification provides several capabilities for improvements. For example, EPDCCH allows increased control channel capacity, supports frequency domain ICIC, and achieves improved spatial reuse of control channel resource. Additionally, EPDCCH supports beamforming and/or diversity, operates in the new carrier type and in Multicast Broadcast Single Frequency Network (MBSFN) subframes, and can coexist on the same carrier as legacy UEs.

A number of alternative approaches exist for implementing EPDCCH. For example, EPDCCH can be implemented in a same manner as Relay PDCCH (R-PDCCH), or in a similar manner to R-PDCCH that allows UL grants to be in the first slot. Alternatively, EPDCCH can be implemented as pure FDM, pure TDM, or as a hybrid of FDM and TDM (e.g., TDM downlink grants and FDM UL grants). A TDM approach allows early decoding methodologies to be implemented, and such early decoding assists a UE in meeting the current 3 ms processing delay imposed for downlink HARQ operation at the maximum cell radius. A pure-FDM EPDCCH approach makes it easier to multiplex EPDCCH and PDSCH, but it lacks the early decoding benefits of the legacy PDCCH. The remainder of this disclosure will address operations that use the pure FDM approach.

In order to alleviate the early decoding issue and minimize the impact on UE implementation, some limitations can be enforced on EPDCCH/PDSCH, such as transport block size limitation and/or reduction of the number of blind decodes of EPDCCH. The current requirement of having to meet the PDSCH processing time limitation at the maximum cell radius implicitly assumes that the UE operates at the UE category maximum peak data rate at 100 km from the serving cell. Such strict requirements serve no practical purpose, especially when considering that the EPDCCH processing already makes the processing requirement challenging to meet.

In order to accommodate the foregoing concerns, it is envisioned that EPDCCH messages can span both first and second slots, with a restriction on the maximum number of transmission channel bits receivable in a Transmission Time Interval (TTI). This restriction allows a relaxation of the processing requirements of the UE. This disclosure is concerned with details regarding when and how to restrict the maximum number of transmission channel bits receivable in a transmission time interval. This solution embraces scheduling in EPDCCH one or two transport blocks for PDSCH transmissions, and skip-decoding being performed by a UE receiving the transport blocks. This solution leverages a legacy skip-decoding process already used in PDSCH, in which the UE may skip-decoding a transport block in the initial HARQ transmission if the effective coding rate for the transport block exceeds 0.93. In the legacy skip-decoding process, if the UE skips-decoding, the physical layer indicates to the higher layer that the transport block is not successfully decoded.

In skip-decoding for EPDCCH, a couple of alternatives exist. For example, in a subframe, a skip-decoding decision for EPDCCH can be performed on a per transport block basis. In other words, the transport block size of each individual transport block can be compared against a threshold. Alternatively, in a subframe, a skip-decoding decision for EPDCCH can be performed on a per Downlink Control Information (DCI) basis. In other words, in the case of two transport blocks in an EPDCCH, the decision to skip decoding can be based on the sum of the sizes of the two transport blocks. Notably, the HARQ-ACK response is normally performed on a per transport block basis, but a relaxed HARQ-ACK response can be implemented for the per DCI alternative, as will be more fully described below with respect to FIG. 15 and FIG. 16.

The transport block size limitation imposed by a UE can be UE-category dependent. For example, it is envisioned that eight or more categories of UEs may be utilized, as set forth in Table 1 below. These categories can have different ratios of maximum bits per TTI to maximum bits per transport block (e.g., 1:1, 2:1, or other such ratios). Accordingly, transport block size limitation may be specified as the sum of transport blocks in a subframe. As an example, the sum of the transport blocks in a subframe may be calculated as one-half of the maximum number of downlink-SCH bits received within the UE category's TTI. Some other aspects may calculate the sum based on other factors, such as one-fourth, instead of one-half.

In alternative or additional aspects of the present disclosure, it is also possible that the transport block size limitation may be performed on a per transport block basis. As an example, the transport block size in a subframe may be calculated as one-half of the maximum number of a downlink-SCH transport block received within the UE category's TTI. Because different UE categories can have different ratios of maximum bits per TTI to maximum bits per transport block, it may also be possible to calculate the transport block size limitation based on the UE category. As an example, for UE category 2, the limitation may be one-fourth, instead of one-half, of the maximum number of a downlink-SCH transport blocks received within the UE category's TTI. In addition, because, for a given UE category, the maximum number of bits of a downlink-SCH transport block received within a TTI also depends on the maximum number of supported layers for spatial multiplexing in downlink, the limitation may also be a function of the maximum number of supported layers for spatial multiplexing in downlink within a UE category.

TABLE 1

| UE Category | Maximum number of downlink-SCH transport block bits received iwthin a TTI | Maximum number of bits of a downlink-SCH transport block receivedw ithin a TTI | Total number of soft channel bits | Maximum number of supported layers for spatial multiplexing in downlink |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

In addition to transport block size, the skip-decoding decision may also be based on the Timing Advance (TA) value at the UE. For example, a TA value of 100 microseconds corresponds to a distance from the serving cell of about 15 kilometers, and this value can be used as a threshold in some aspects for determining when skip-decoding may occur. Unlike prior skip-decoding decisions made with respect to high coding rate PDSCH, EPDCCH skip-decoding must take into account that, during the HARQ transmissions of a transport block (including both initial and re-transmissions), the TA value at the UE can change due to TA commands from the eNB and/or autonomous TA adjustment at the UE. Thus, there are three cases to consider: (1) the TA values for all HARQ transmissions of the transport block can exceed the threshold; (2) the initial transport block transmission TA value can be below the threshold, while the TA value of one or more re-transmissions of the transport block exceed the threshold; or (3) the initial transport block transmission TA value can be above the threshold, while the TA value of one or more re-transmissions of the transport block can be below the threshold. Accordingly, there may be different processes for making a skip-decoding decision.

Figure 9:
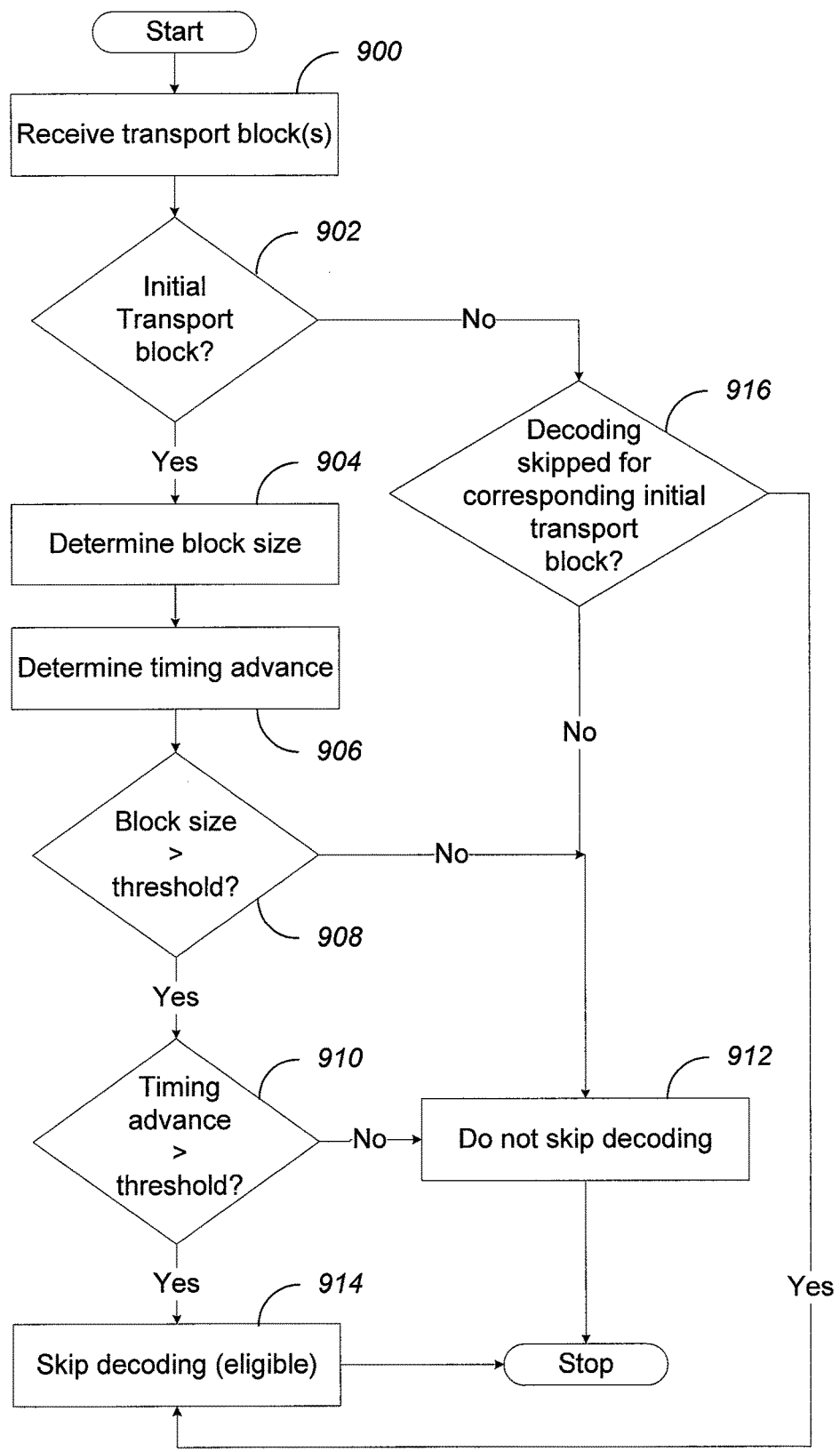
FIG. 9 is a functional block diagram illustrating example blocks executed to implement one aspect of the present disclosure.

FIG. 9 is a functional block diagram illustrating example blocks executed to implement one aspect of the present disclosure. When executed, a method for wireless transmission is shown in which a skip-decoding decision for the initial HARQ transmission of a transport block also controls the skip-decoding decision for all retransmissions of that transport block. At block 900, transport blocks are received. At block 902, a determination is made whether a received block is an initial transport block. If so, then transport block size is determined at block 904, while the TA size is determined at block 906. At block 908, a determination is made whether the transport block size exceeds the size threshold. If so, then a determination is made at block 910 whether the TA exceeds the timing advance threshold. If the determinations are negative at either block 908 or block 910, then a decision is made at block 912 not to skip decoding of the transport block. Otherwise, a decision can be made at block 914 to skip decoding. In some embodiments, the transport block may be marked as eligible for skip-decoding at block 914, and then the UE may decide whether to perform skip-decoding of that transport block based on additional factors (e.g., probabilistically). It is also possible that the UE may take a different but equivalent action for those transport blocks marked as eligible for skip-decoding, such as always decoding, but reducing the number of turbo iterations (sacrificing demodulation performance). If the determination at block 902 is negative, the transport block is a re-transmission, and block 916 is executed. For any re-transmissions of a transport block, the UE can determine at block 916 what skip-decoding decision was made with respect to the initial transport block, and apply that decision to the re-transmitted transport block.

Figure 10:
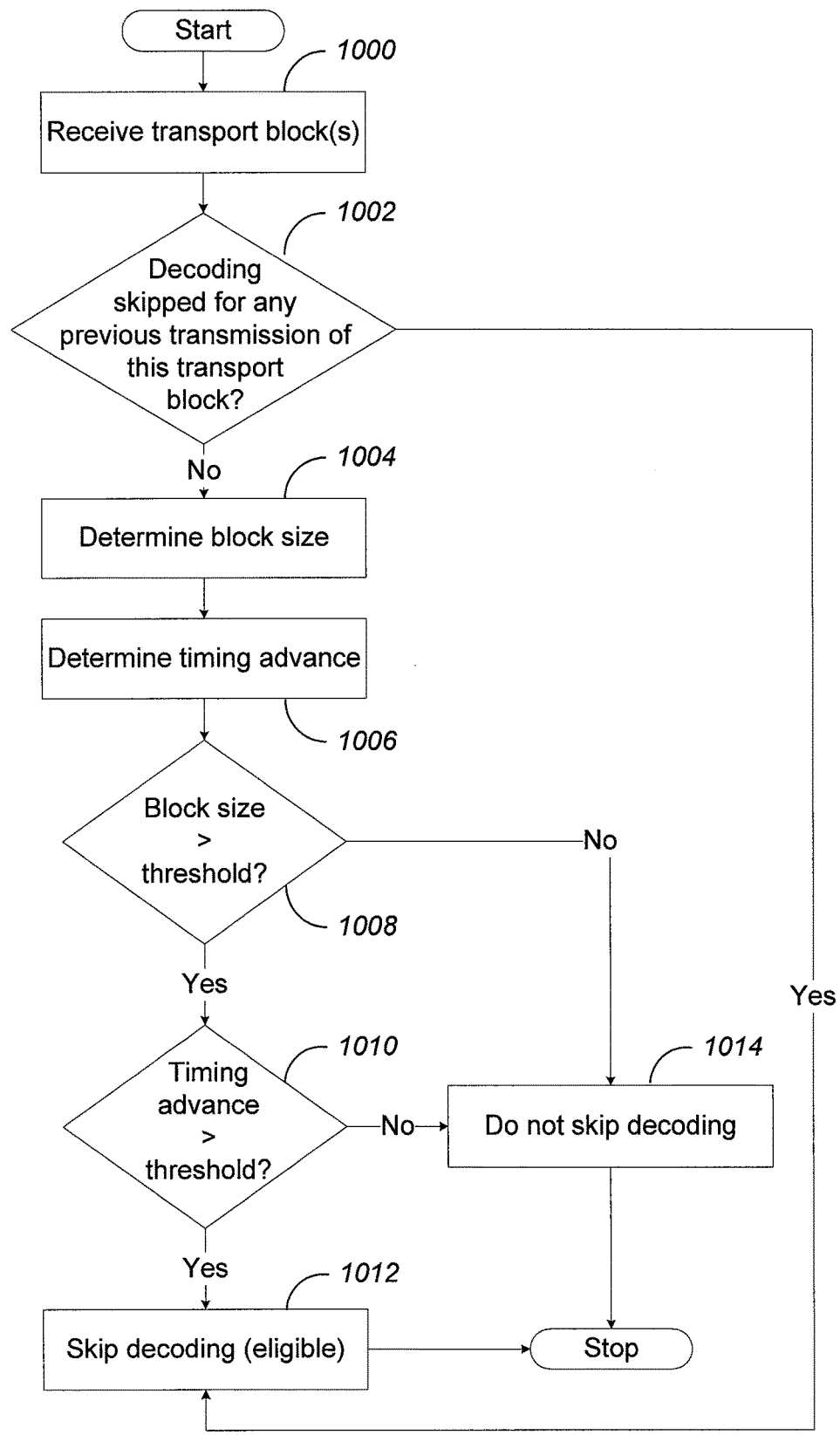
FIG. 10 is a functional block diagram illustrating example blocks executed to implement one aspect of the present disclosure.

FIG. 10 is a functional block diagram illustrating example blocks executed to implement one aspect of the present disclosure. When executed, a method for wireless transmission is shown in which a skip-decoding decision is made for all HARQ transmissions of the same transport block based on whether any of the transmissions satisfy the requirements for skip-decoding. At block 1000, transport blocks are received. At block 1002, the UE determines whether a decision was made to skip decoding for any other transmissions of the received transport block. If so, then a decision is made at block 1004 to skip decoding or mark the transport block as eligible for skip-decoding, as described above with respect to FIG. 9. Otherwise, block size and TA are determined at blocks 1006 and 1008, respectively. Then, at block 1010, a determination is made whether the transport block size exceeds the transport block size threshold. If so, then another determination is made at block 1012 whether the TA exceeds the TA threshold. If the determinations are negative at either block 1010 or block 1012, then a decision is made at block 1014 not to skip decoding of the transport block. Otherwise, the decision is made at block 1004 to skip decoding or mark the transport block as eligible for skip-decoding, as described above with respect to FIG. 9.

Figure 11:
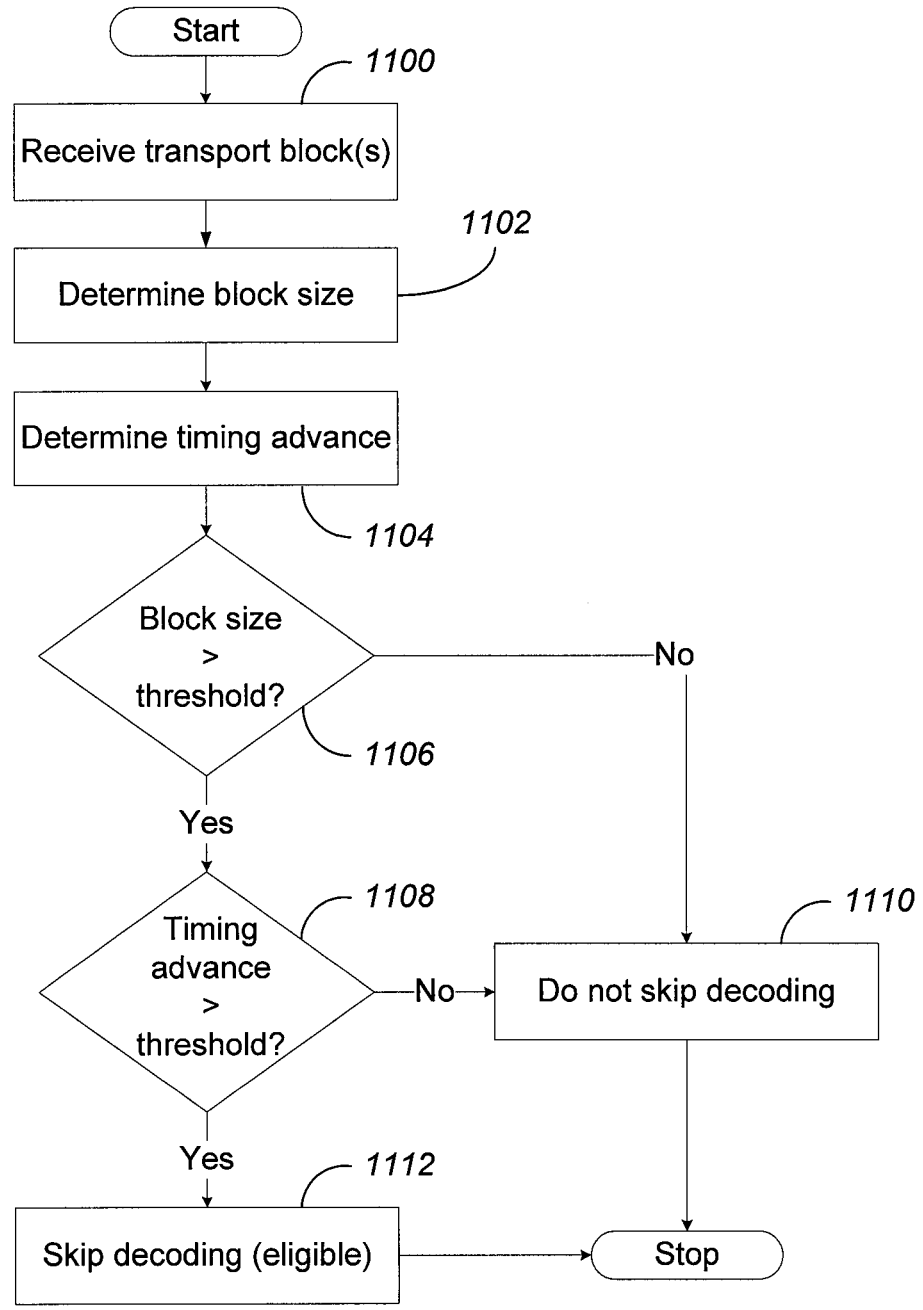
FIG. 11 is a functional block diagram illustrating example blocks executed to implement one aspect of the present disclosure.

FIG. 11 is a functional block diagram illustrating example blocks executed to implement one aspect of the present disclosure. When executed, a method for wireless transmission is shown in which a skip-decoding decision is made independently for each HARQ transmission of a transport block. At block 1100, transport blocks are received. Block size and TA are determined at blocks 1102 and 1104, respectively. Then, at block 1106, a determination is made whether the transport block size exceeds a transport block size threshold. If so, then a further determination is made at block 1108 whether the TA exceeds the TA threshold. If the determinations are negative at either block 1106 or block 1108, then a decision is made at block 1110 not to skip decoding of the transport block. Otherwise, the decision is made at block 1112 to skip decoding or mark the transport block as eligible for skip-decoding, as described above with respect to FIG. 9.

Figure 12:
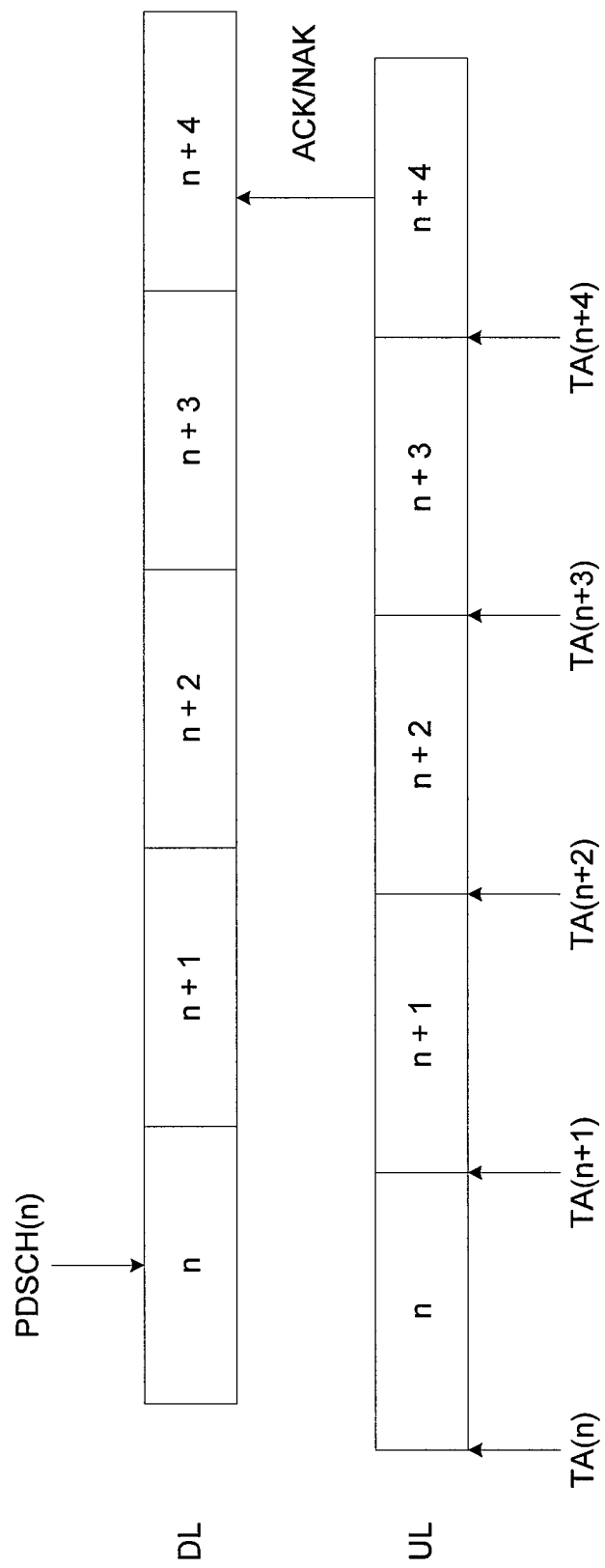
FIG. 12 is a block diagram illustrating timing advance in a Frequency Division Duplex (FDD) transmission.

There are many options for determining the TA of a transport block. The question arises regarding which TA should be selected in blocks 906, 1008, and 1104, as described above with respect to FIG. 9, FIG. 10, and FIG. 11, respectively. FIG. 12 explores some of the alternative aspects for TA determination according to the present disclosure.

FIG. 12 is a block diagram illustrating TA assignment in an FDD transmission. It should be understood that, for a PDSCH in subframe n, an ACK/NAK is expected in subframe n+k. For FDD, k=4, and for Time Division Duplex (TDD), k≥4, with the actual value depending on the TDD downlink/uplink subframe configuration. It is possible to utilize any TA values (or a combination thereof) corresponding to subframes n, n+1, and so forth to n+k. As an example, TA(n+4) may be used, because it determines the time between the PDSCH transmission and the ACK/NAK feedback. However, it may also result in unnecessary delay in the skip-decoding decision. As another example, TA(n) may be used.

As mentioned above, for TDD, the value of k depends on the downlink/uplink subframe configuration. Further, for a given downlink/uplink subframe configuration, the value of k may also vary across different downlink subframes. For example, for a PDSCH transmission in subframe n, ACK/NAK is n+4 (k=4), and for a PDSCH transmission in subframe m≠n, ACK/NAK is m+6 (k=6). When k>4, the need for transport block size limitation is reduced. Accordingly, there can be several options for making skip-decoding decisions in the case of TDD, one of which is to simply apply the same skip-decoding decision process employed in the FDD case as discussed above with respect to FIGS. 9-11. Other alternatives are discussed below with respect to FIGS. 13-14.

Figure 13:
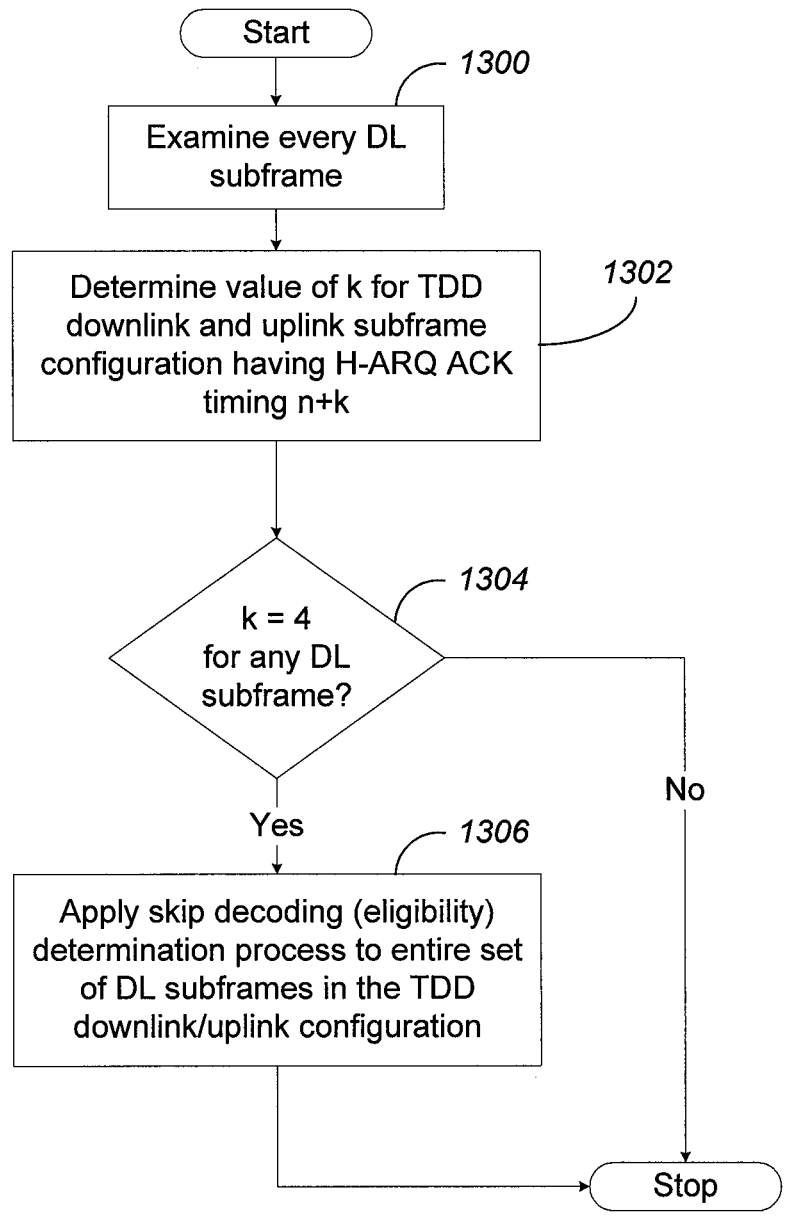
FIG. 13 is a functional block diagram illustrating example blocks executed to implement one aspect of the present disclosure.

FIG. 13 is a functional block diagram illustrating example blocks executed to implement one aspect of the present disclosure. When executed, a method for wireless transmission in TDD downlink and uplink configurations is shown in which a skip-decoding decision process is selectively applied to an entire set of downlink subframes if any of the downlink subframes in the set have k=4. Starting at block 1300, every downlink subframe in an entire set is examined, and the value of k is determined at block 1302 for the TDD downlink and uplink subframe configuration having HARQ ACK timing n+k. At block 1304, a determination is made whether k=4 for any downlink subframe in the set. If so, then the skip-decoding decision making process described above is applied at block 1306 to the entire set of downlink subframes in the TDD downlink/uplink configuration. Otherwise, the skip-decoding decision making process is not made with respect to any of the downlink subframes.

Figure 14:
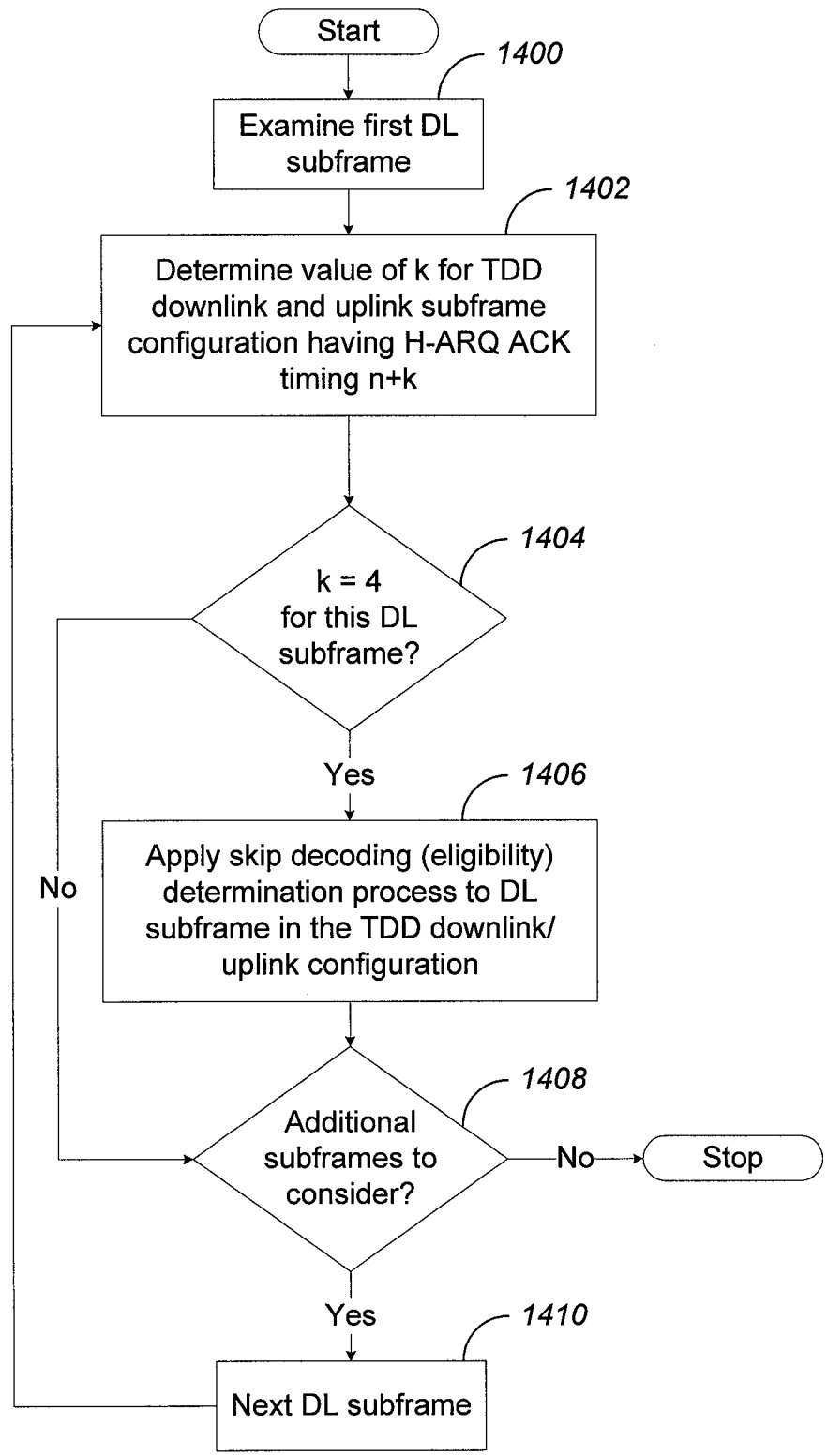
FIG. 14 is a functional block diagram illustrating example blocks executed to implement one aspect of the present disclosure.

FIG. 14 is a functional block diagram illustrating example blocks executed to implement one aspect of the present disclosure. When executed, a method for wireless transmission in TDD downlink and uplink configurations is shown in which a skip-decoding decision process is selectively applied to downlink subframes in a set of downlink subframes in an individual basis. Starting at block 1400, a first downlink subframe in a set is examined as a current downlink subframe, and the value of k is determined at block 1402 for the TDD downlink and uplink subframe configuration having HARQ ACK timing n+k. At block 1404, a determination is made whether k=4 for the current downlink subframe. If so, then the skip-decoding decision making process described above is applied at block 1406 to the current downlink subframes in the TDD downlink/uplink configuration. A determination is made at block 1408 whether additional subframes exist in the set to examine. If so, then a next subframe in the set is set as the current downlink subframe at block 1410, and processing returns to block 1402. Otherwise, the selective application of the skip-decoding decision making process to the downlink subframes comes to an end.

Figure 15:
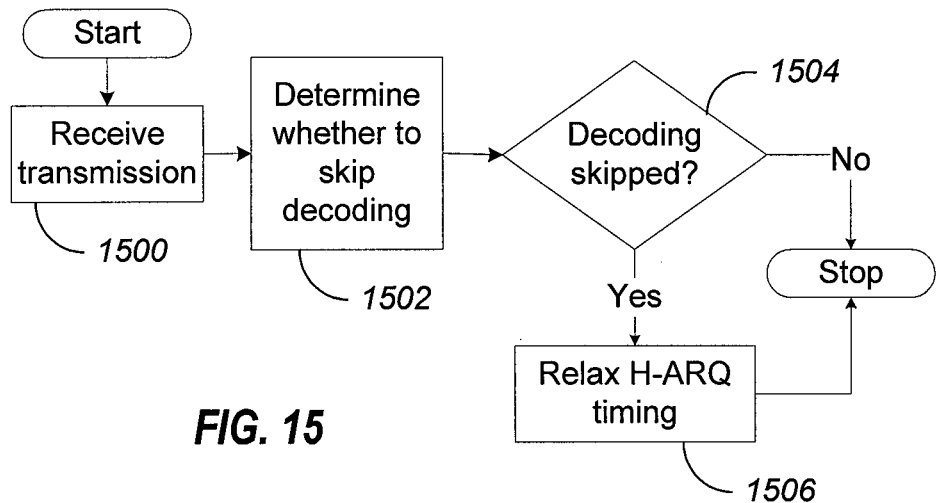
FIG. 15 is a functional block diagram illustrating example blocks executed to implement one aspect of the present disclosure.

As presented above, a relax HARQ timing operation may also be employed to decrease unnecessary consumption of UE processing resources. FIG. 15 is a functional block diagram illustrating example blocks executed to implement one aspect of the present disclosure. When executed, a method for wireless communication is shown in which a relax HARQ timing decision is made. At block 1500, the UE receives a transmission. A decision is made at block 1502 whether to skip decoding. A determination is made whether skip-decoding occurred at block 1504. If so, a decision is made at block 1506 to relax HARQ timing by delaying an ACK/NAK transmission at least until a next HARQ transmission opportunity. Otherwise, the ACK/NAK transmission can take place at the regularly scheduled time.

Figure 16:
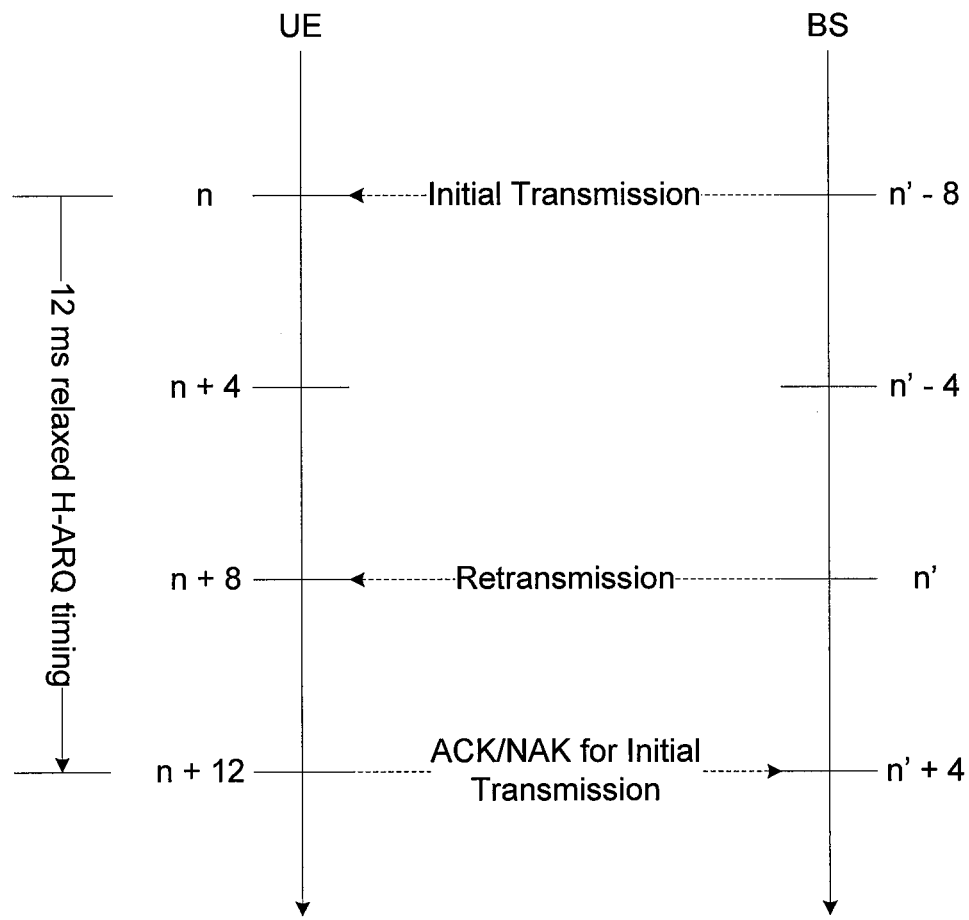
FIG. 16 discloses an example of relax HARQ timing operation in response to the relax HARQ timing decision.

FIG. 16 is a diagram illustrating a UE timeline and BS timeline configured with relax HARQ timing operation in response to the relax HARQ timing decision. In this example, the UE receives an initial transmission from a BS at time n and decides to skip decoding and relax the HARQ timing. As a result, no ACK/NAK is transmitted by the UE at n+4. The BS performs re-transmission at n', which corresponds to n+8. The next HARQ transmission opportunity of the UE is at n+12, which corresponds to n'+4. Accordingly, the UE sends the ACK/NAK at n+12 for the initial transmission, which the BS determines as being for the retransmission.

There are a number of alternatives for the UE to implement a soft buffer management scheme with respect to skip-decoding. Some aspects of the present disclosure take into account soft buffer overbooking. In FDD, the number of downlink HARQ processes is fixed at 8. In contrast, for TDD, the number of downlink HARQ processes depends on the TDD downlink/uplink configurations. For some TDD downlink/uplink configurations, the number of downlink HARQ processes may be larger than 8. As an example, for TDD downlink/uplink configuration 5, there are up to 15 downlink HARQ processes. However, only up to 8 HARQ process soft buffers are specified for TDD UEs. The UE may dynamically swap the buffer for different HARQ processes based on need. For a transport block that the UE skips decoding, it may be beneficial not to store samples for the transport block, but use the soft buffer for other HARQ processes. The alternatives are explored with reference to FIGS. 17-19.

Figure 17:
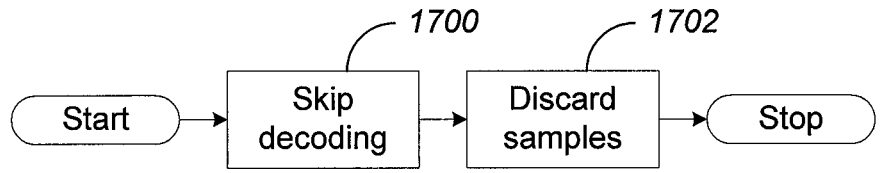
FIG. 17 is a functional block diagram illustrating example blocks executed to implement one aspect of the present disclosure.

FIG. 17 is a functional block diagram illustrating example blocks executed to implement one aspect of the present disclosure. When executed, a method for wireless communication is shown in which soft buffer management includes always discarding samples that were received in a subframe in which a UE skipped decoding. At block 1700, decoding is skipped for a transport block. Samples received for the transport block are discarded at block 1702 without storing them in the soft buffer. In this alternative, samples are always discarded without regard for soft buffer overbooking. This alternative is not good if, for subsequent re-transmissions of the same transport block, the skip-decoding conditions are not met (due to reduced TA value) and the UE may decode the subsequent re-transmissions of the same transport block.

Figure 18:
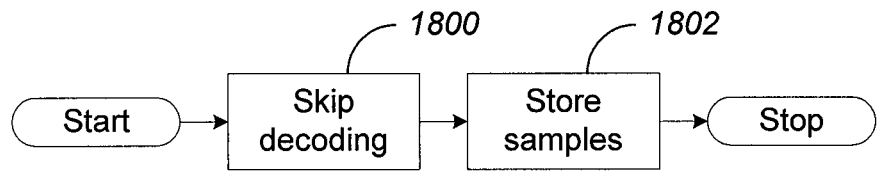
FIG. 18 is a functional block diagram illustrating example blocks executed to implement one aspect of the present disclosure.

FIG. 18 is a functional block diagram illustrating example blocks executed to implement one aspect of the present disclosure. When executed, a method for wireless communication is shown in which soft buffer management includes storage of samples that were received in a subframe in which a UE skipped decoding. At block 1800, decoding is skipped for a transport block. Samples received for the transport block are stored in the soft buffer at block 1802. In this alternative, samples are always stored without regard for soft buffer overbooking. This alternative is good for subsequent re-transmissions of the same transport block, when the UE may not skip decoding. However, this alternative is not good if the soft buffer is overbooked.

Figure 19:
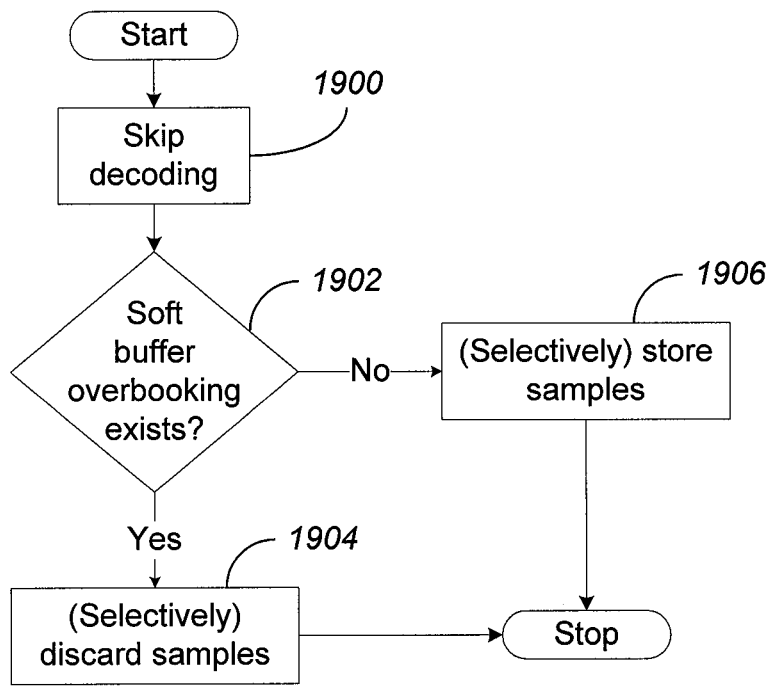
FIG. 19 is a functional block diagram illustrating example blocks executed to implement one aspect of the present disclosure.

FIG. 19 is a functional block diagram illustrating example blocks executed to implement one aspect of the present disclosure. When executed, a method for wireless communication is shown in which soft buffer management includes selective discarding of samples received in a subframe in which a UE skips decoding if soft buffer overbooking exists. Here the existence of soft buffer overbooking may be defined when the specified maximum number of downlink HARQ processes exceeds a threshold (e.g., 8). Alternatively, the existence of soft buffer overbooking may be defined when the active number of downlink HARQ processes at the UE exceeds a threshold (e.g., 8), where a downlink HARQ process is active if it has an ongoing HARQ transmission. Decoding is skipped in block 1900. The UE makes a determination at block 1902 whether soft buffer overbooking exists. Samples received in a subframe in which the UE skipped decoding are selectively discarded at block 1904. Otherwise, samples are selectively stored at block 1906. In the case of selective storage, samples will always be stored in FDD because there is no soft buffer overbooking in FDD. In TDD, the UE may selectively discard samples of skipped transport block in presence of soft buffer overbooking. The UE may also take other factors into consideration. In other aspects, the UE may store the samples, but may mark the samples as eligible to be discarded if the need arises.

As discussed above, communications systems may be implemented with carrier aggregation, in which there can be more than one component carrier (CC). However, it is also envisioned that component carriers can be grouped into two or more TA groups having different TA values. Transport block size limitation may be enforced on a per carrier basis, on a per TA group basis, or on a per UE basis. Thus, in some alternatives, the UE may enforce the transport block size limitation by summing the transport block sizes across all carriers and comparing them to a threshold. In some other alternative aspects, the UE may enforce the transport block size limitation by summing the transport block sizes across the carriers in the same TA group and comparing them to a threshold. This decision may be dependent on the UE category. Also, there may be a number of options for determining the TA of a CC, as explored below with reference to FIGS. 20 and 21.

Figure 20:
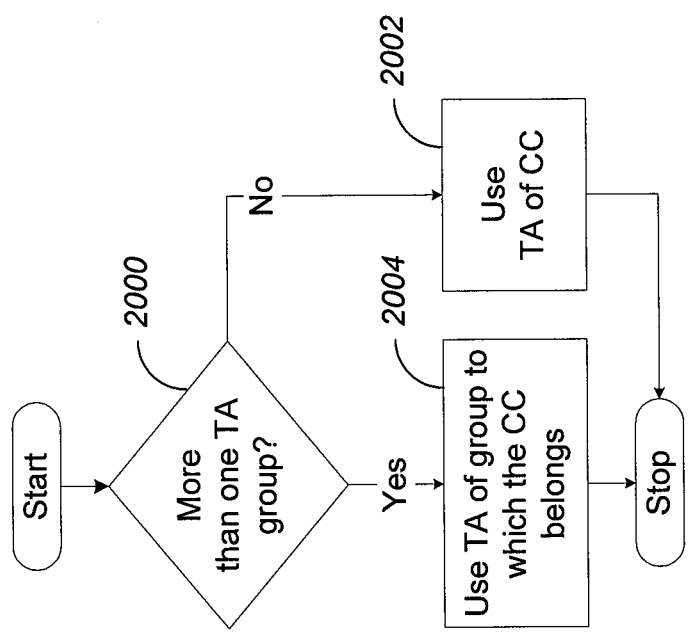
FIG. 20 is a functional block diagram illustrating example blocks executed to implement one aspect of the present disclosure.

FIG. 20 is a functional block diagram illustrating example blocks executed to implement one aspect of the present disclosure. When executed, a method for wireless communication is shown in which TA selection is carried out for a CC in the presence of more than one TA group. In this alternative aspect, a determination is made whether there is more than one TA group at block 2000. If not, then the TA of the CC (which is the same as the TA of the primary CC) is used in making the skip-decoding decision at block 2002. Otherwise, the TA of the group to which the CC belongs is selected at block 2004 and used for making the skip-decoding decision for all CCs in the TA group.

Figure 21:
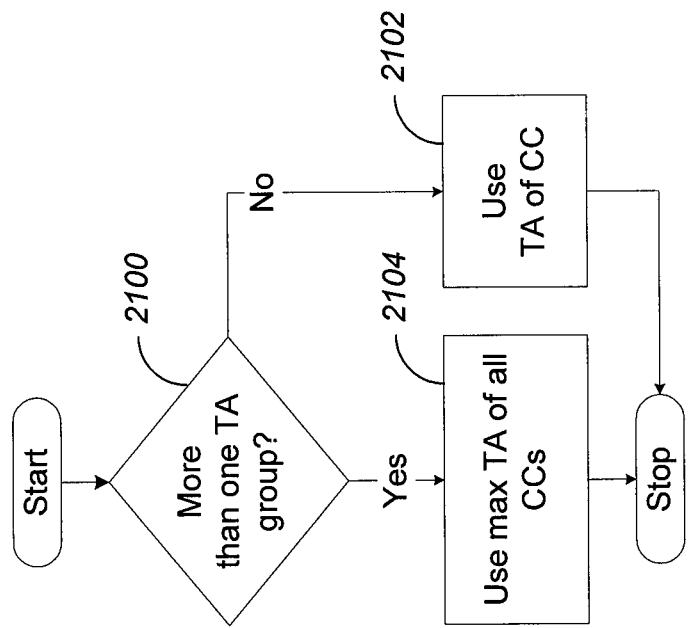
FIG. 21 is a functional block diagram illustrating example blocks executed to implement one aspect of the present disclosure.

Also, FIG. 21 is a functional block diagram illustrating example blocks executed to implement one aspect of the present disclosure. When executed, a method for wireless communication is shown in which TA selection is carried out for a CC in the presence of more than one TA group. In this alternative aspect, a determination is made, at block 2100, whether there is more than one TA group. If not, then the TA of the CC is used in making the skip-decoding decision at block 2102. Otherwise, a maximum TA of all CCs is selected at block 2104 and used for making skip-decoding decisions for all CCs across all TA groups.

The UE may signal to the eNB, from which it received a transmission, when the timing advance exceeds the timing advance threshold, or whether it skips decoding or not. This signaling can assist the eNB in managing its scheduling for the UE. The UE can perform this signaling using the Radio Resource Control (RRC) layer, MAC layer, and/or physical (PHY) layer. It is also envisioned that the signaling information can be one-bit or multi-bit, with the multi-bit option permitting specification of different levels of TA values. The decision whether to configure signaling for a UE can be UE capability dependent. For example, for UEs capable of handling tight HARQ timing, such signaling may be skipped. In other aspects, eNBs can use the signaling information for outer loop management. For example, the eNB may ignore NAKs resulting from skip-decoding. Additionally, the eNB may manage the outer loop in such a way that the max transport block size limitation is observed, and skip-decoding avoided. Such management may depend on UE category.

The UE may monitor legacy PDCCH and EPDCCH simultaneously on a carrier. For example, a UE may monitor legacy PDCCH in a first subframe, and may monitor EPDCCH in a second subframe. As another example, a UE may monitor legacy PDCCH using one decoding candidate in a subframe, and may monitor EPDCCH using another decoding candidate in the same subframe. Due to different structures for legacy PDCCH and EPDCCH, the restriction on the maximum number of transmission channel bits receivable in a TTI (and all the related behaviors discussed earlier) may be applied only to a PDSCH scheduled by EPDCCH, but not applied to a PDSCH scheduled by PDCCH. For a PDSCH transmission without the corresponding PDCCH, e.g., due to semi-persistently scheduling, the restriction may not be applied as well. Alternatively, the restriction can be applied to all PDSCHs for the UE as long as the UE is configured with EPDCCH, even if the UE only monitors EPDCCH in a subset of subframes and/or a subset of decoding candidates in a subframe. As an example, the UE may indicate its capability of whether it can handle an EPDCCH-scheduled PDSCH without any restriction on the maximum number of transmission channel bits receivable in a TTI. If the UE indicates such restriction is necessary, and if the UE further monitors both legacy PDCCH and EPDCCH simultaneously on a carrier, the restriction may be applied to the EPDCCH-scheduled PDSCH transmissions only. Alternatively, such restriction can be applied to all PDSCHs for the UE as long as the UE is configured with EPDCCH.

It should be noted that the various aspects of the present disclosure are not limited to any single manner in which to apply or not apply the restriction on the maximum number of transmission channel bits receivable in a TTI.

Figure 22:
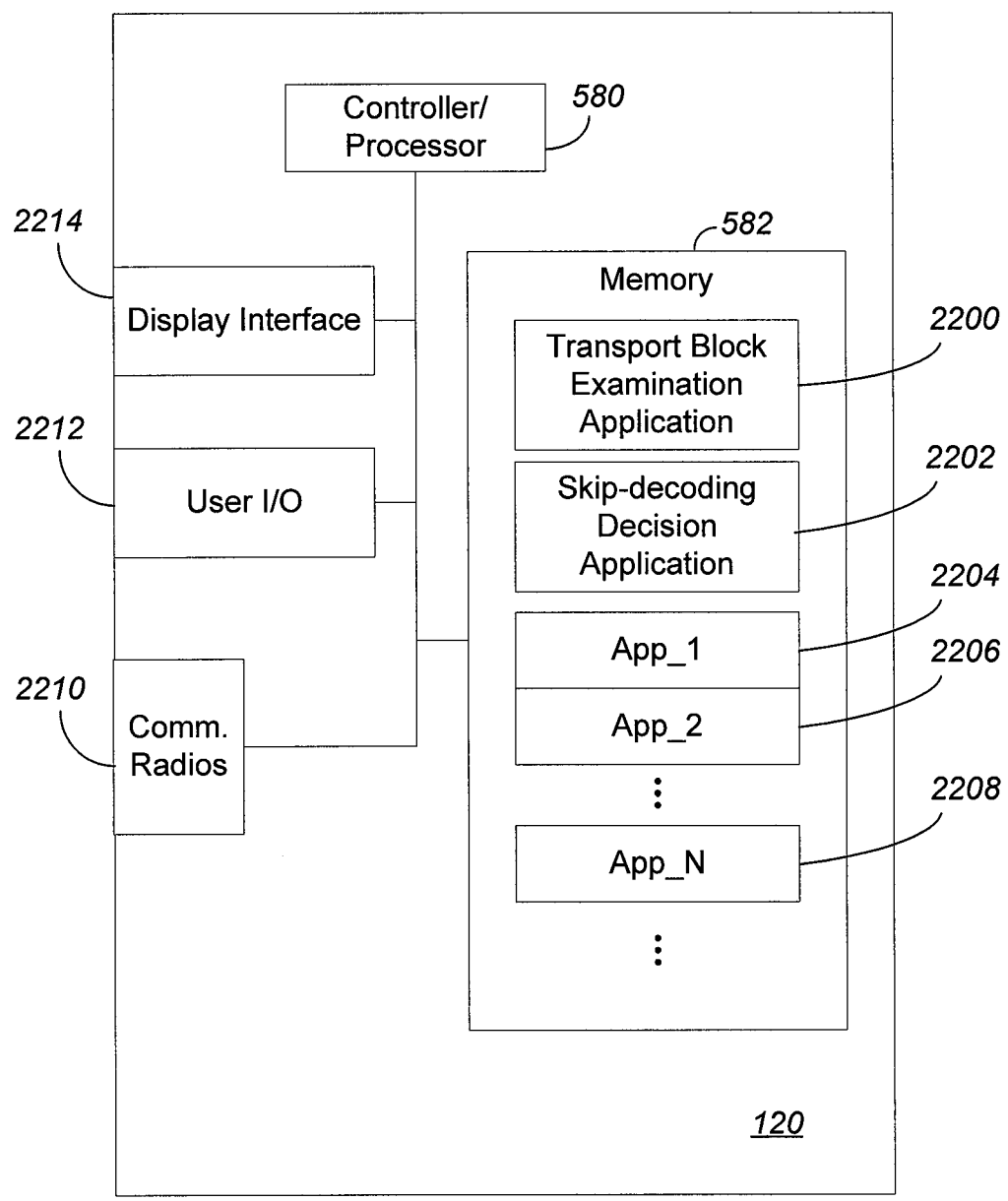
FIG. 22 is a block diagram illustrating a UE configured according to one aspect of the present disclosure.
Figure 23:
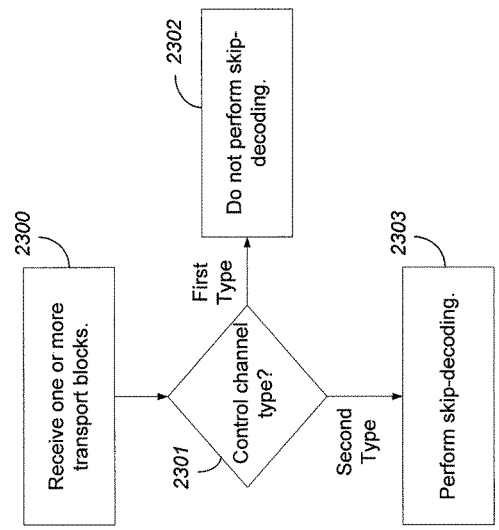
FIG. 23 is a functional block diagram illustrating example blocks executed to implement one aspect of the present disclosure.

FIG. 23 is a functional block diagram illustrating example blocks executed to implement one aspect of the present disclosure. At block 2300, a UE receives one or more transport blocks. With reference also to FIG. 22, UE 120 receives transport blocks through communication radio 2210, under control of controller/processor 580. The combination of those components and acts may provide means for receiving, by a UE, one or more transport blocks.

A determination is made, at block 2301, of the type of control channel that is associated with the transport blocks. Transport block examination application 2200, stored in memory 582 and executed by controller/processor 580, will examine the transport blocks to determine what type of control channel is associated with the received blocks. If the control channel type is of a first type, then, at block 2302, the UE does not perform skip-decoding. Otherwise, if the control channel is of a second type, then, at block 2303, skip-decoding is performed of at least one transport block of the received blocks. The combination of these components and acts may provide means for determining a control channel type associated with the one or more transport blocks and means for selecting, by the UE, to perform a skip-decoding of at least one transport block of the one or more transport blocks based, at least in part, on the control channel type.

Skip-decoding may include completely skipping the decoding of the transport blocks or it may include additional or alternative actions. For example, skip-decoding may include delaying HARQ-ACK decisions of the transport blocks. It may also or alternatively include a lower level of decoding, such as decoding using a best efforts approach. A best efforts decoding approach provide a low complexity decoding algorithm, which, if unsuccessful, may not trigger additional decoding attempts.

Figure 24:
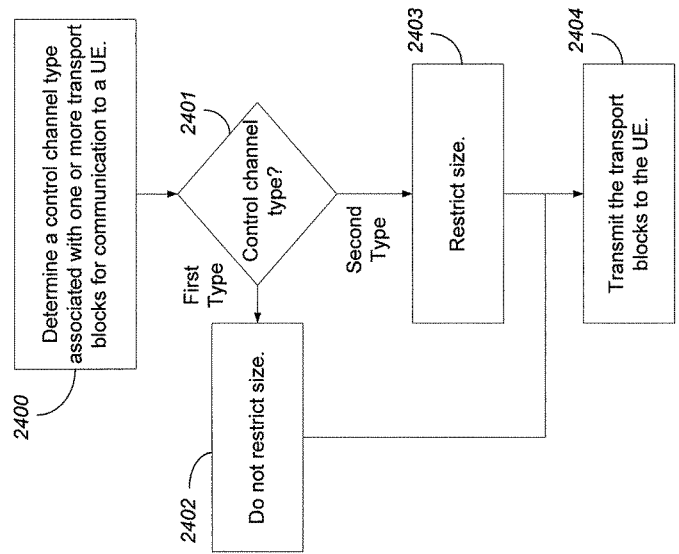
FIG. 24 is a functional block diagram illustrating example blocks executed to implement one aspect of the present disclosure.

FIG. 24 is a functional block diagram illustrating example blocks executed to implement one aspect of the present disclosure. At block 2400, a base station selects the control channel type associated with one or more transport blocks designated for communication with a particular UE. With reference to FIG. 5, eNB 110 may select the control channel for the transport blocks using scheduler 544 and code stored in memory 542 executed by and under control of controller/processor 540. A determination is made, at block 2401, of the type of control channel that was selected. If a first type of control channel is selected, then, at block 2402, no size restriction is imposed on the transport blocks. Otherwise, if a second type of control channel is selected, then, at block 2403, the base station imposes a size restriction on the transport blocks. The combination of these components and acts may provide means for determining, at a base station, a control channel type associated with one or more transport blocks for communication to a UE and determining whether to restrict a size of at least one transport block of the one or more transport blocks, wherein the determination is based, at least in part, on the control channel type At block 2404, the base station then transmits the blocks according to the determination. Under control of controller/processor 540, eNB 110 transmits transport blocks using transmit processor 520, TX MIMO processor 530, modulator/demodulators 532a-t, and antennas 534a-t. The combination of these components and acts may provide means for transmitting the one or more transport blocks to the UE based on the determination.

It should be noted that, with regard to FIGS. 23 and 24, the first type of control channel may be either a PDCCH or an EPDCCH. Whichever of those control channels is designated as the first type, the second type will be the other. For example, in selected aspects, if the first type of control channel is the PDCCH, then the second type will be the EPDCCH, and vice versa.

It should further be noted that, in additional aspects of the present disclosure, the determination of whether to perform the skip-decoding may also be based on whether the block size of any of the blocks received exceeds a particular threshold, as referenced in FIGS. 9-11.

FIG. 22 is a block diagram illustrating a UE 120 configured according to one aspect of the present disclosure. UE 120 includes controller/processor 580 that controls and executes the functionalities and features provided by UE 120. UE 120 may be any number of mobile electronic devices, including mobile phones, mobile computers, tablet computers, notebook, netbook, or laptop computers, and the like. UE 120 includes memory 582, coupled to controller/processor 580. Memory 582 contains various software, program code, data, and the like which the controller/processor 580 may access and execute to implement any of the functions of mobile device UE 120 For example, memory 582 contains a transport block examination application 2200, a skip-decoding decision application 2202, and various applications, application_1 2204—application_N 2208. UE 120 includes communication capabilities through communication radios 2210. Under control of controller/processor 580, communication radios 2210 send and receive data and voice signals over various types of wireless protocols. Communication radios 2210 include multiple radios to facility communication of the various protocols, including WWAN communication, WLAN communications, such as WIFI™, BLUETOOTH®, WIFI™ Direct, BLUETOOTH® Low Energy (LE), ZIGBEE®, and the like. The combination of these components provides means for receiving, by the UE 120, one or more transport blocks.

In order to interact with users, user input/output (I/O) interface 2212, under control of controller/processor 580, provides means for a user to input information and output information. Such user I/O interface 2210 may provide access to keyboards, microphones, speakers, touch screens, and the like. Display interface 2214, under control of controller/processor 580, is related to the user I/O interface 2212, but provides the interface and control for displaying visual information to the user on a display of UE 120 (not shown) as well as receiving input from the user via touch screen technology. Under control of the controller/processor 580, these various components of UE 120 provide multiple electronic and communication functions to a user.

A transport block examination application 2200 is stored in memory 582. When executed by controller/processor 580, the executing transport block examination application 2200 causes the controller processor 580 to perform size determination and timing determination with respect to received transport blocks, by comparing the block sizes and TAs of the received transport blocks to predetermined thresholds. The combination of these components provides means for performing, by the UE 120, a size determination whether a block size of at least one transport block of the one or more transport blocks exceeds a block size threshold, and means for performing, by the UE 120, a timing determination whether a timing advance of the at least one transport block exceeds a timing advance threshold.

A skip-decoding decision application 2200 is stored in memory 582. When executed by controller/processor 580, the executing skip-decoding decision application 2200 causes the controller/processor 580 to make a decision whether to skip decoding of received transport blocks based on results of the comparisons made by the transport block examination application 2200. The combination of these components provides means for making a skip-decoding decision, by the UE 120, whether to perform skip-decoding of the at least one transport block at least partly in response to results of the size determination and the timing determination.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 8-11, 13-15, and 17-24 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), one or more transport blocks;
   determining a control channel type associated with the one or more transport blocks; and
   selecting, by the UE, to perform a skip-decoding of at least one transport block of the one or more transport blocks based, at least in part, on the control channel type, wherein the skip-decoding comprises
   attempting to decode the one or more transport blocks using a best-efforts approach that employs a decoding algorithm, which, if unsuccessful, does not trigger additional decoding attempts.

2. The method of claim 1, wherein the control channel type comprises one of:
   a physical downlink control channel (PDCCH); and
   an enhanced PDCCH (EPDCCH).

3. The method of claim 2, wherein the UE selects to perform the skip-decoding when the control channel type comprises the EPDCCH.

4. The method of claim 2, wherein the UE selects to not perform the skip-decoding when the control channel type comprises the PDCCH.

5. The method of claim 4, wherein the UE is configured to monitor for the EPDCCH.

6. The method of claim 1, wherein the selecting to perform a skip-decoding is further based, at least in part, on a block size of at least one transport block of the one or more transport blocks exceeds a block size threshold.

7. A method of wireless communication, comprising:
determining, at a base station, a control channel type associated with one or more transport blocks for communication to a user equipment (UE);
determining, by the base station, whether to restrict a size of at least one transport block of the one or more transport blocks, wherein the determination is based, at least in part, on the control channel type; and
transmitting, by the base station, the one or more transport blocks to the UE based on the determination.

8. The method of claim 7, wherein the control channel type comprises one of:
a physical downlink control channel (PDCCH); and
an enhanced PDCCH (EPDCCH).

9. The method of claim 8, wherein the base station determines to restrict the size of the at least one transport block for the one or more transport blocks associated with the EPDCCH in a first subframe, and
wherein the base station determines not to restrict the size of the at least one transport block for the one or more transport blocks associated with the PDCCH in a second subframe.

10. The method of claim 8, wherein the base station determines to restrict the size of the at least one transport block for the one or more transport blocks associated with the PDCCH when the UE is configured to monitor for the EPDCCH.

11. The method of claim 7, wherein the determining is further based, at least in part, on an indication that a capability of the UE requires restriction of the size.

12. A method of wireless communication, comprising:
receiving, by a user equipment (UE), one or more transport blocks;
performing, by the UE, a size determination whether a block size of at least one transport block of the one or more transport blocks exceeds a block size threshold;
performing, by the UE, a timing determination whether a timing advance of the at least one transport block exceeds a timing advance threshold; and
making a skip-decoding decision, by the UE, whether to perform skip-decoding of the at least one transport block at least partly in response to results of the size determination and the timing determination.

13. The method of claim 12, further including:
controlling, by the UE, the skip-decoding decision for all Hybrid Automatic-Repeat-Request (HARQ) retransmissions of the at least one transport block at least partly in response to a skip-decoding decision made, by the UE, with respect to an initial HARQ transmission of that transport block.

14. The method of claim 12, further including:
controlling, by the UE, the skip-decoding decision for all HARQ transmissions of the at least one transport block at least partly in response to a skip-decoding decision made, by the UE, with respect to any other HARQ transmission of that transport block.

15. The method of claim 12, further including:
controlling, by the UE, the skip-decoding decision for each HARQ transmission of the at least one transport block on an individual basis.

16. The method of claim 12, further including:
determining, by the UE, a value of k for a TDD downlink and uplink configuration having HARQ ACK timing n+k;
determining, by the UE, whether to apply a skip-decoding decision process to all downlink subframes in an entire set of downlink subframes based on whether any downlink subframe in the entire set of downlink subframes exhibits k=4.

17. The method of claim 12, further including:
determining, by the UE, a value of k for a TDD downlink and uplink configuration having HARQ ACK timing n+k;
selectively determining, by the UE, whether to individually apply a skip-decoding decision process to each downlink subframe in an entire set of downlink subframes based on whether each downlink subframe exhibits k=4.

18. The method of claim 12, further including:
making, by the UE, a relax HARQ timing decision in response to the skip-decoding decision, wherein the relax HARQ timing decision causes the UE to delay an ACK/NAK transmission at least until a next HARQ transmission opportunity.

19. The method of claim 12, further including:
performing, by the UE, soft buffer management by discarding samples received in a subframe in which the UE skipped decoding.

20. The method of claim 12, further including:
performing, by the UE, soft buffer management by storing samples received in a subframe in which the UE skipped decoding.

21. The method of claim 12, further including:
performing, by the UE, soft buffer management by making a determination whether soft buffer overbooking exists; and
selectively discarding samples received in a subframe in which the UE skipped decoding in response to the determination.

22. The method of claim 12, further including:
performing timing advance selection for a component carrier in the presence of more than one timing advance group, wherein the timing advance of the group to which the component carrier belongs is selected.

23. The method of claim 12, further including:
performing timing advance selection for a component carrier in the presence of more than one timing advance group, wherein a maximum timing advance of all component carriers is selected.

24. The method of claim 12, wherein the size determination performs transport block size limitation on a per downlink control information basis, wherein the skip-decoding decision is made on the basis of a sum of sizes of two transport blocks.

25. The method of claim 12, wherein the size determination performs transport block size limitation on a per downlink control information basis, wherein the skip-decoding decision is made on the basis of a sum of sizes of four transport blocks.

26. The method of claim 12, wherein the size determination performs transport block size limitation on a UE-category dependent basis.

27. The method of claim 12, wherein the size determination performs transport block size limitation based on a sum of sizes of transport blocks in a subframe.

28. The method of claim 12, wherein the size determination performs transport block size limitation individually for each transport block in a subframe.

29. The method of claim 12, wherein the UE signals to an evolved Node B (eNB) from which it received the at least one transport block when the timing advance of the at least one transport block exceeds the timing advance threshold.

30. The method of claim 29, wherein the UE signals to the eNB by at least one of a Radio Resource Control (RRC) layer, Medium Access Control (MAC) layer, or physical (PHY) layer.

31. An apparatus configured for wireless communication, comprising:
   means for receiving, by a user equipment (UE), one or more transport blocks;
   means for determining a control channel type associated with the one or more transport blocks; and
   means for selecting, by the UE, to perform a skip-decoding of at least one transport block of the one or more transport blocks based, at least in part, on the control channel type, wherein the skip-decoding comprises
      means for attempting to decode the one or more transport blocks using a best-efforts approach that employs a decoding algorithm, which, if unsuccessful, does not trigger additional decoding attempts.

32. The apparatus of claim 31, wherein the control channel type comprises one of:
   a physical downlink control channel (PDCCH); and
   an enhanced PDCCH (EPDCCH).

33. The apparatus of claim 32, wherein the UE selects to perform the skip-decoding when the control channel type comprises the EPDCCH.

34. The apparatus of claim 32, wherein the UE selects to not perform the skip-decoding when the control channel type comprises the PDCCH.

35. The apparatus of claim 34, wherein the UE is configured to monitor for the EPDCCH.

36. The apparatus of claim 31, wherein the means for selecting to perform a skip-decoding is further based, at least in part, on a block size of at least one transport block of the one or more transport blocks exceeds a block size threshold.

37. An apparatus configured for wireless communication, comprising:
   means for determining, at a base station, a control channel type associated with one or more transport blocks for communication to a user equipment (UE);
   means for determining, by the base station, whether to restrict a size of at least one transport block of the one or more transport blocks, wherein the determination is based, at least in part, on the control channel type; and
   means for transmitting, by the base station, the one or more transport blocks to the UE based on the determination.

38. The apparatus of claim 37, wherein the control channel type comprises one of:
   a physical downlink control channel (PDCCH); and
   an enhanced PDCCH (EPDCCH).

39. The apparatus of claim 38, wherein the base station determines to restrict the size of the at least one transport block for the one or more transport blocks associated with the EPDCCH in a first subframe, and
   wherein the base station determines not to restrict the size of the at least one transport block for the one or more transport blocks associated with the PDCCH in a second subframe.

40. The apparatus of claim 38, wherein the base station determines to restrict the size of the at least one transport block for the one or more transport blocks associated with the PDCCH when the UE is configured to monitor for the EPDCCH.

41. The apparatus of claim 37, wherein the means for determining is further based, at least in part, on an indication that a capability of the UE requires restriction of the size.

42. An apparatus configured for wireless communication, comprising:
   means for receiving, by a user equipment (UE), one or more transport blocks;
   means for performing, by the UE, a size determination whether a block size of at least one transport block of the one or more transport blocks exceeds a block size threshold;
   means for performing, by the UE, a timing determination whether a timing advance of the at least one transport block exceeds a timing advance threshold; and
   means for making a skip-decoding decision, by the UE, whether to perform skip-decoding of the at least one transport block at least partly in response to results of the size determination and the timing determination.

43. The apparatus of claim 42, further including:
   means for controlling, by the UE, the skip-decoding decision for all Hybrid Automatic-Repeat-Request (HARQ) retransmissions of the at least one transport block at least partly in response to a skip-decoding decision made, by the UE, with respect to an initial HARQ transmission of that transport block.

44. The apparatus of claim 42, further including:
   means for controlling, by the UE, the skip-decoding decision for all HARQ transmissions of the at least one transport block at least partly in response to a skip-decoding decision made, by the UE, with respect to any other HARQ transmission of that transport block.

45. The apparatus of claim 42, further including:
   means for controlling, by the UE, the skip-decoding decision for each HARQ transmission of the at least one transport block on an individual basis.

46. The apparatus of claim 42, further including:
   means for determining, by the UE, a value of k for a TDD downlink and uplink configuration having HARQ ACK timing n+k;
   means for determining, by the UE, whether to apply a skip-decoding decision process to all downlink subframes in an entire set of downlink subframes based on whether any downlink subframe in the entire set of downlink subframes exhibits k=4.

47. The apparatus of claim 42, further including:
   means for determining, by the UE, a value of k for a TDD downlink and uplink configuration having HARQ ACK timing n+k;
   means for selectively determining, by the UE, whether to individually apply a skip-decoding decision process to each downlink subframe in an entire set of downlink subframes based on whether each downlink subframe exhibits k=4.

48. The apparatus of claim 42, further including:
   means for making, by the UE, a relax HARQ timing decision in response to the skip-decoding decision, wherein the relax HARQ timing decision causes the UE to delay an ACK/NAK transmission at least until a next HARQ transmission opportunity.

49. The apparatus of claim 42, further including:
means for performing, by the UE, soft buffer management by discarding samples received in a subframe in which the UE skipped decoding.

50. The apparatus of claim 42, further including:
means for performing, by the UE, soft buffer management by storing samples received in a subframe in which the UE skipped decoding.

51. The apparatus of claim 42, further including:
means for performing, by the UE, soft buffer management by making a determination whether soft buffer overbooking exists; and
selectively discarding samples received in a subframe in which the UE skipped decoding in response to the determination.

52. The apparatus of claim 42, further including:
means for performing timing advance selection for a component carrier in the presence of more than one timing advance group, wherein the timing advance of the group to which the component carrier belongs is selected.

53. The apparatus of claim 42, further including:
means for performing timing advance selection for a component carrier in the presence of more than one timing advance group, wherein a maximum timing advance of all component carriers is selected.

54. The apparatus of claim 42, wherein the means for performing the size determination performs transport block size limitation on a per downlink control information basis, wherein the skip-decoding decision is made on the basis of a sum of sizes of two transport blocks.

55. The apparatus of claim 42, wherein the means for performing the size determination performs transport block size limitation on a per downlink control information basis, wherein the skip-decoding decision is made on the basis of a sum of sizes of four transport blocks.

56. The apparatus of claim 42, wherein the means for performing the size determination performs transport block size limitation on a UE-category dependent basis.

57. The apparatus of claim 42, wherein the means for performing the size determination performs transport block size limitation based on a sum of sizes of transport blocks in a subframe.

58. The apparatus of claim 42, wherein the means for performing the size determination performs transport block size limitation individually for each transport block in a subframe.

59. The apparatus of claim 42, further including:
means for signaling, by the UE to an evolved Node B (eNB) from which it received the at least one transport block, when the timing advance of the at least one transport block exceeds the timing advance threshold.

60. The apparatus of claim 59, wherein the means for signaling performs the signaling via at least one of Medium Access Control (MAC) layer, or physical (PHY) layer.

61. A non-transitory computer-readable medium having program code recorded thereon, the program code including:
program code for causing at least one computer to receive, by a user equipment (UE), one or more transport blocks;
program code for causing at least one computer to determine a control channel type associated with the one or more transport blocks; and program code for causing at least one computer to select, by the UE, to perform a skip-decoding of at least one transport block of the one or more transport blocks based, at least in part, on the control channel type, wherein the skip-decoding comprises
program code for attempting to decode the one or more transport blocks using a best-efforts approach that employs a decoding algorithm, which, if unsuccessful, does not trigger additional decoding attempts.

62. A non-transitory computer-readable medium having program code recorded thereon, the program code including:
program code for causing at least one computer to determine, at a base station, a control channel type associated with one or more transport blocks for communication to a user equipment (UE);
program code for causing at least one computer to determine, by the base station, whether to restrict a size of at least one transport block of the one or more transport blocks, wherein the determination is based, at least in part, on the control channel type; and
program code for causing at least one computer to transmit, by the base station, the one or more transport blocks to the UE based on the determination.

63. A non-transitory computer-readable medium having program code recorded thereon, the program code including:
program code for causing at least one computer to receive, by a user equipment (UE), one or more transport blocks;
program code for causing at least one computer to perform, by the UE, a size determination whether a block size of at least one transport block of the one or more transport blocks exceeds a block size threshold;
program code for causing at least one computer to perform, by the UE, a timing determination whether a timing advance of the at least one transport block exceeds a timing advance threshold; and
program code for causing at least one computer to make a skip-decoding decision, by the UE, whether to perform skip decoding of the at least one transport block at least partly in response to results of the size determination and the timing determination.

64. An apparatus configured for wireless communication, the apparatus comprising:
at least one processor; and
a memory coupled to the at least one processor,
wherein the at least one processor is configured:
to receive, by a user equipment (UE), one or more transport blocks;
to determine a control channel type associated with the one or more transport blocks; and
to select, by the UE, to perform a skip-decoding of at least one transport block of the one or more transport blocks based, at least in part, on the control channel type, wherein the skip-decoding comprises
to attempt to decode the one or more transport blocks using a best-efforts approach that employs a decoding algorithm, which, if unsuccessful, does not trigger additional decoding attempts.

65. An apparatus configured for wireless communication, the apparatus comprising:
at least one processor; and
a memory coupled to the at least one processor,
wherein the at least one processor is configured:
to determine, at a base station, a control channel type associated with one or more transport blocks for communication to a user equipment (UE);

to determine, by the base station, whether to restrict a size of at least one transport block of the one or more transport blocks, wherein the determination is based, at least in part, on the control channel type; and to transmit, by the base station, the one or more transport blocks to the UE based on the determination.

66. An apparatus configured for wireless communication, the apparatus comprising:

at least one processor; and a memory coupled to the at least one processor, wherein the at least one processor is configured:

to receive, by a user equipment (UE), one or more transport blocks;

to perform, by the UE, a size determination whether a block size of at least one transport block of the one or more transport blocks exceeds a block size threshold;

to perform, by the UE, a timing determination whether a timing advance of the at least one transport block exceeds a timing advance threshold; and to make a skip-decoding decision, by the UE, whether to perform skip decoding of the at least one transport block at least partly in response to results of the size determination and the timing determination.

* * * * *